United States Patent
Gahagan et al.

(10) Patent No.: US 11,685,684 B2
(45) Date of Patent: Jun. 27, 2023

(54) CONTOURED GLASS ARTICLES AND METHODS OF MAKING THE SAME

(71) Applicant: CORNING INCORPORATED, Corning, NY (US)

(72) Inventors: Kevin Thomas Gahagan, Painted Post, NY (US); Sean Matthew Garner, Elmira, NY (US); Michael James McFarland, Corning, NY (US); Michael John Moore, Corning, NY (US)

(73) Assignee: Corning Incorporated, Corning, NY (US)

( * ) Notice: Subject to any disclaimer, the term of this patent is extended or adjusted under 35 U.S.C. 154(b) by 546 days.

(21) Appl. No.: 16/613,569

(22) PCT Filed: May 15, 2018

(86) PCT No.: PCT/US2018/032700
§ 371 (c)(1),
(2) Date: Nov. 14, 2019

(87) PCT Pub. No.: WO2018/213267
PCT Pub. Date: Nov. 22, 2018

(65) Prior Publication Data
US 2021/0188685 A1    Jun. 24, 2021

Related U.S. Application Data

(60) Provisional application No. 62/506,024, filed on May 15, 2017.

(51) Int. Cl.
C03B 23/00    (2006.01)
C03B 23/023    (2006.01)

(52) U.S. Cl.
CPC .................. *C03B 23/023* (2013.01)

(58) Field of Classification Search
None
See application file for complete search history.

(56) References Cited

U.S. PATENT DOCUMENTS

| 2,068,030 A | 1/1937 | Lieser |
| 2,608,030 A | 8/1952 | Jendrisak |

(Continued)

FOREIGN PATENT DOCUMENTS

| CN | 1587132 A | 3/2005 |
| CN | 1860081 A | 11/2006 |

(Continued)

OTHER PUBLICATIONS

Miika Äppelqvist Curved glass, an obstacle or opportunity in glass architecture (2015) (Year: 2015).*

(Continued)

*Primary Examiner* — Jodi C Franklin

(57) ABSTRACT

Embodiments of a method for making a contoured glass article and the resulting contoured glass article are disclosed. In one or more embodiments, the method includes cold bending a flat glass sheet having first and second opposing major surfaces, at least one region having a first thickness, and at least one region having a second thickness that is less than the first thickness, to produce cold bent glass sheet having at least one bend region along a portion of the at least one region having the second thickness; and restraining the cold bent glass sheet to produce the contoured glass article. One or more embodiments pertain to the resulting contoured glass article.

17 Claims, 6 Drawing Sheets

(56) References Cited

U.S. PATENT DOCUMENTS

| | | | |
|---|---|---|---|
| 3,197,903 | A | 8/1965 | Walley |
| 3,338,696 | A | 8/1967 | Dockerty |
| 3,582,456 | A | 6/1971 | Stolki |
| 3,682,609 | A | 8/1972 | Dockerty |
| 3,753,840 | A | 8/1973 | Plumat |
| 3,778,335 | A | 12/1973 | Boyd |
| 3,790,430 | A | 2/1974 | Mochel |
| 3,799,817 | A | 3/1974 | Laethem |
| 4,081,263 | A * | 3/1978 | Mestre ............... C03B 23/0258 65/273 |
| 4,147,527 | A | 4/1979 | Bystrov et al. |
| 4,238,265 | A | 12/1980 | Deminet |
| 4,289,520 | A * | 9/1981 | Bolton ............... C03B 23/0315 65/273 |
| 4,445,953 | A | 5/1984 | Hawk |
| 4,455,338 | A | 6/1984 | Henne |
| 4,859,636 | A | 8/1989 | Aratani et al. |
| 4,899,507 | A | 2/1990 | Mairlot |
| 4,969,966 | A | 11/1990 | Norman |
| 4,985,099 | A | 1/1991 | Mertens et al. |
| 5,108,480 | A | 4/1992 | Sugiyama |
| 5,154,117 | A | 10/1992 | Didelot et al. |
| 5,173,102 | A | 12/1992 | Weber et al. |
| 5,245,468 | A | 9/1993 | Demiryont et al. |
| 5,250,146 | A | 10/1993 | Horvath |
| 5,264,058 | A | 11/1993 | Hoagland et al. |
| 5,279,635 | A * | 1/1994 | Flaugher ............ C03B 23/0307 65/106 |
| 5,300,184 | A | 4/1994 | Masunaga |
| 5,589,248 | A * | 12/1996 | Tomozane ............... E06B 3/66 428/167 |
| 5,711,119 | A | 1/1998 | Cornils et al. |
| 5,897,937 | A | 4/1999 | Cornils et al. |
| 6,044,662 | A | 4/2000 | Morin |
| 6,086,983 | A | 7/2000 | Yoshizawa |
| 6,101,748 | A | 8/2000 | Cass et al. |
| 6,242,931 | B1 | 6/2001 | Hembree et al. |
| 6,265,054 | B1 | 7/2001 | Bravet et al. |
| 6,270,605 | B1 | 8/2001 | Doerfler |
| 6,274,219 | B1 | 8/2001 | Schuster et al. |
| 6,287,674 | B1 | 9/2001 | Verlinden et al. |
| 6,302,985 | B1 | 10/2001 | Takahashi et al. |
| 6,332,690 | B1 | 12/2001 | Murofushi |
| 6,387,515 | B1 | 5/2002 | Joret et al. |
| 6,420,800 | B1 | 7/2002 | Levesque et al. |
| 6,426,138 | B1 | 7/2002 | Narushima et al. |
| 6,582,799 | B1 | 6/2003 | Brown et al. |
| 6,620,365 | B1 | 9/2003 | Odoi et al. |
| 6,816,225 | B2 | 11/2004 | Colgan et al. |
| 6,903,871 | B2 | 6/2005 | Page |
| 7,297,040 | B2 | 11/2007 | Chang et al. |
| 7,375,782 | B2 | 5/2008 | Yamazaki et al. |
| 7,478,930 | B2 | 1/2009 | Choi |
| 7,489,303 | B1 | 2/2009 | Pryor |
| 7,542,302 | B1 | 6/2009 | Curnalia et al. |
| 7,750,821 | B1 | 7/2010 | Taborisskiy et al. |
| 7,955,470 | B2 | 6/2011 | Kapp et al. |
| 8,298,431 | B2 | 10/2012 | Chwu et al. |
| 8,344,369 | B2 | 1/2013 | Yamazaki et al. |
| 8,521,955 | B2 | 8/2013 | Arulambalam et al. |
| 8,549,885 | B2 | 10/2013 | Dannoux et al. |
| 8,586,492 | B2 | 11/2013 | Barefoot et al. |
| 8,652,978 | B2 | 2/2014 | Dejneka et al. |
| 8,692,787 | B2 | 4/2014 | Imazeki |
| 8,702,253 | B2 | 4/2014 | Lu et al. |
| 8,765,262 | B2 | 7/2014 | Gross |
| 8,814,372 | B2 | 8/2014 | Vandal et al. |
| 8,833,106 | B2 | 9/2014 | Dannoux et al. |
| 8,912,447 | B2 | 12/2014 | Leong et al. |
| 8,923,693 | B2 | 12/2014 | Yeates |
| 8,962,084 | B2 | 2/2015 | Brackley et al. |
| 8,967,834 | B2 | 3/2015 | Timmerman et al. |
| 8,969,226 | B2 | 3/2015 | Dejneka et al. |
| 8,978,418 | B2 | 3/2015 | Balduin et al. |
| 9,007,226 | B2 | 4/2015 | Chang |
| 9,061,934 | B2 | 6/2015 | Bisson et al. |
| 9,090,501 | B2 | 7/2015 | Okahata et al. |
| 9,109,881 | B2 | 8/2015 | Roussev et al. |
| 9,140,543 | B1 | 9/2015 | Allan et al. |
| 9,156,724 | B2 | 10/2015 | Gross |
| 9,223,162 | B2 | 12/2015 | Deforest et al. |
| 9,240,437 | B2 | 1/2016 | Shieh et al. |
| 9,278,500 | B2 | 3/2016 | Filipp |
| 9,278,655 | B2 | 3/2016 | Jones et al. |
| 9,290,413 | B2 | 3/2016 | Dejneka et al. |
| 9,346,703 | B2 | 5/2016 | Bookbinder et al. |
| 9,346,706 | B2 | 5/2016 | Bazemore et al. |
| 9,357,638 | B2 | 5/2016 | Lee et al. |
| 9,376,337 | B2 * | 6/2016 | Odani ............... G06F 1/1626 |
| 9,442,028 | B2 | 9/2016 | Roussev et al. |
| 9,446,723 | B2 | 9/2016 | Stepanski |
| 9,469,561 | B2 | 10/2016 | Kladias et al. |
| 9,517,967 | B2 | 12/2016 | Dejneka et al. |
| 9,522,837 | B2 * | 12/2016 | Afzal ............... C03B 23/0357 |
| 9,573,843 | B2 | 2/2017 | Keegan et al. |
| 9,593,042 | B2 | 3/2017 | Hu et al. |
| 9,595,960 | B2 | 3/2017 | Wilford |
| 9,606,625 | B2 | 3/2017 | Levesque et al. |
| 9,617,180 | B2 | 4/2017 | Bookbinder et al. |
| 9,663,396 | B2 | 5/2017 | Miyasaka et al. |
| 9,688,562 | B2 * | 6/2017 | Ukrainczyk ............ C03B 33/00 |
| 9,694,570 | B2 | 7/2017 | Levasseur et al. |
| 9,700,985 | B2 | 7/2017 | Kashima et al. |
| 9,701,564 | B2 | 7/2017 | Bookbinder et al. |
| 9,720,450 | B2 | 8/2017 | Choi et al. |
| 9,724,727 | B2 | 8/2017 | Domey |
| 9,802,485 | B2 | 10/2017 | Masuda et al. |
| 9,815,730 | B2 | 11/2017 | Marjanovic et al. |
| 9,821,509 | B2 | 11/2017 | Kastell |
| 9,895,975 | B2 | 2/2018 | Lee et al. |
| 9,902,640 | B2 | 2/2018 | Dannoux et al. |
| 9,931,817 | B2 | 4/2018 | Rickerl |
| 9,933,820 | B2 | 4/2018 | Helot et al. |
| 9,947,882 | B2 | 4/2018 | Zhang et al. |
| 9,955,602 | B2 | 4/2018 | Wildner et al. |
| 9,957,190 | B2 | 5/2018 | Finkeldey et al. |
| 9,963,374 | B2 | 5/2018 | Jouanno et al. |
| 9,972,645 | B2 | 5/2018 | Kim |
| 9,975,801 | B2 | 5/2018 | Maschmeyer et al. |
| 9,992,888 | B2 | 6/2018 | Moon et al. |
| 10,005,246 | B2 | 6/2018 | Stepanski |
| 10,017,033 | B2 | 7/2018 | Fisher et al. |
| 10,042,391 | B2 | 8/2018 | Yun et al. |
| 10,074,824 | B2 | 9/2018 | Han et al. |
| 10,086,762 | B2 | 10/2018 | Uhm |
| 10,131,118 | B2 | 11/2018 | Kang et al. |
| 10,140,018 | B2 | 11/2018 | Kim et al. |
| 10,153,337 | B2 | 12/2018 | Lee et al. |
| 10,175,802 | B2 | 1/2019 | Boggs et al. |
| 10,211,416 | B2 | 2/2019 | Jin et al. |
| 10,222,825 | B2 | 3/2019 | Wang et al. |
| 10,273,184 | B2 | 4/2019 | Garner et al. |
| 10,303,223 | B2 | 5/2019 | Park et al. |
| 10,303,315 | B2 | 5/2019 | Jeong et al. |
| 10,326,101 | B2 | 6/2019 | Oh et al. |
| 10,328,865 | B2 | 6/2019 | Jung |
| 10,343,377 | B2 | 7/2019 | Levasseur et al. |
| 10,343,944 | B2 * | 7/2019 | Jones ............... C03B 23/0258 |
| 10,347,700 | B2 | 7/2019 | Yang et al. |
| 10,377,656 | B2 | 8/2019 | Dannoux et al. |
| 10,421,683 | B2 | 9/2019 | Schillinger et al. |
| 10,427,383 | B2 | 10/2019 | Levasseur et al. |
| 10,444,427 | B2 | 10/2019 | Bookbinder et al. |
| 10,483,210 | B2 | 11/2019 | Gross et al. |
| 10,500,958 | B2 | 12/2019 | Cho et al. |
| 10,556,818 | B2 * | 2/2020 | Fujii ............... C03C 3/085 |
| 10,606,395 | B2 | 3/2020 | Boggs et al. |
| 11,192,815 | B2 * | 12/2021 | Fujii ............... C03B 23/0258 |
| 11,292,343 | B2 * | 4/2022 | Kumar ............... B32B 3/28 |
| 11,331,886 | B2 * | 5/2022 | Brennan ............ B32B 17/10743 |
| 2002/0039229 | A1 | 4/2002 | Hirose et al. |
| 2004/0026021 | A1 | 2/2004 | Groh et al. |
| 2004/0069770 | A1 | 4/2004 | Cary et al. |
| 2004/0107731 | A1 | 6/2004 | Doehring et al. |

(56) References Cited

U.S. PATENT DOCUMENTS

| | | |
|---|---|---|
| 2004/0258929 A1 | 12/2004 | Glaubitt et al. |
| 2005/0178158 A1 | 8/2005 | Moulding et al. |
| 2006/0227125 A1 | 10/2006 | Wong et al. |
| 2007/0188871 A1 | 8/2007 | Fleury et al. |
| 2007/0195419 A1 | 8/2007 | Tsuda et al. |
| 2007/0210621 A1 | 9/2007 | Barton et al. |
| 2007/0221313 A1 | 9/2007 | Franck et al. |
| 2007/0223121 A1 | 9/2007 | Franck et al. |
| 2007/0291384 A1 | 12/2007 | Wang |
| 2008/0031991 A1 | 2/2008 | Choi et al. |
| 2008/0093753 A1 | 4/2008 | Schuetz |
| 2008/0285134 A1 | 11/2008 | Closset et al. |
| 2008/0303976 A1 | 12/2008 | Nishizawa et al. |
| 2009/0096937 A1 | 4/2009 | Bauer et al. |
| 2009/0101208 A1 | 4/2009 | Vandal et al. |
| 2009/0117332 A1 | 5/2009 | Ellsworth et al. |
| 2009/0179840 A1* | 7/2009 | Tanaka ............... G02F 1/133305 345/87 |
| 2009/0185127 A1 | 7/2009 | Tanaka et al. |
| 2009/0201443 A1 | 8/2009 | Sasaki et al. |
| 2009/0311497 A1 | 12/2009 | Aoki |
| 2010/0000259 A1 | 1/2010 | Ukrainczyk et al. |
| 2010/0031590 A1 | 2/2010 | Buchwald et al. |
| 2010/0065342 A1 | 3/2010 | Shaikh |
| 2010/0103138 A1 | 4/2010 | Huang et al. |
| 2010/0182143 A1 | 7/2010 | Lynam |
| 2010/0245253 A1 | 9/2010 | Rhyu et al. |
| 2011/0057465 A1 | 3/2011 | Beau et al. |
| 2011/0148267 A1 | 6/2011 | McDaniel et al. |
| 2011/0176236 A1* | 7/2011 | Lu ............... F24S 23/79 65/60.2 |
| 2012/0050975 A1 | 3/2012 | Garelli et al. |
| 2012/0111056 A1 | 5/2012 | Prest |
| 2012/0128952 A1 | 5/2012 | Miwa et al. |
| 2012/0134025 A1 | 5/2012 | Hart |
| 2012/0144866 A1 | 6/2012 | Liu et al. |
| 2012/0152897 A1 | 6/2012 | Cheng et al. |
| 2012/0196110 A1 | 8/2012 | Murata et al. |
| 2012/0202030 A1 | 8/2012 | Kondo et al. |
| 2012/0218640 A1 | 8/2012 | Gollier et al. |
| 2012/0263945 A1 | 10/2012 | Yoshikawa |
| 2012/0280368 A1 | 11/2012 | Garner et al. |
| 2012/0320509 A1 | 12/2012 | Kim et al. |
| 2013/0020007 A1 | 1/2013 | Niiyama et al. |
| 2013/0033885 A1 | 2/2013 | Oh et al. |
| 2013/0070340 A1 | 3/2013 | Shelestak et al. |
| 2013/0081428 A1 | 4/2013 | Liu et al. |
| 2013/0086948 A1* | 4/2013 | Bisson ............... C03B 23/0258 65/273 |
| 2013/0088441 A1 | 4/2013 | Chung et al. |
| 2013/0120850 A1 | 5/2013 | Lambert et al. |
| 2013/0186141 A1 | 7/2013 | Henry |
| 2013/0209824 A1 | 8/2013 | Sun et al. |
| 2013/0279188 A1 | 10/2013 | Entenmann et al. |
| 2013/0298608 A1* | 11/2013 | Langsdorf ............ C03B 23/035 65/106 |
| 2013/0314642 A1 | 11/2013 | Timmerman et al. |
| 2013/0329346 A1 | 12/2013 | Dannoux et al. |
| 2013/0330495 A1 | 12/2013 | Maatta et al. |
| 2014/0014260 A1 | 1/2014 | Chowdhury et al. |
| 2014/0036428 A1 | 2/2014 | Seng et al. |
| 2014/0065374 A1 | 3/2014 | Tsuchiya et al. |
| 2014/0141206 A1 | 5/2014 | Gillard et al. |
| 2014/0146538 A1 | 5/2014 | Zenker et al. |
| 2014/0153234 A1 | 6/2014 | Knoche et al. |
| 2014/0153894 A1 | 6/2014 | Jenkins et al. |
| 2014/0168153 A1 | 6/2014 | Deichmann et al. |
| 2014/0168546 A1 | 6/2014 | Magnusson et al. |
| 2014/0234581 A1* | 8/2014 | Immerman ......... C03B 23/0235 65/273 |
| 2014/0308464 A1* | 10/2014 | Levasseur ............ B29C 53/04 29/447 |
| 2014/0312518 A1 | 10/2014 | Levasseur et al. |
| 2014/0333848 A1 | 11/2014 | Chen |
| 2014/0340609 A1 | 11/2014 | Taylor et al. |
| 2015/0000341 A1* | 1/2015 | Bisson ............... C03B 23/0235 65/273 |
| 2015/0015807 A1 | 1/2015 | Franke et al. |
| 2015/0072129 A1 | 3/2015 | Okahata et al. |
| 2015/0077429 A1 | 3/2015 | Eguchi et al. |
| 2015/0166394 A1 | 6/2015 | Marjanovic et al. |
| 2015/0168768 A1 | 6/2015 | Nagatani |
| 2015/0177443 A1 | 6/2015 | Faecke et al. |
| 2015/0210588 A1* | 7/2015 | Chang ................. B32B 17/06 428/220 |
| 2015/0246424 A1 | 9/2015 | Venkatachalam et al. |
| 2015/0246507 A1 | 9/2015 | Brown et al. |
| 2015/0274570 A1* | 10/2015 | Wada ................. C03B 23/0235 65/273 |
| 2015/0274572 A1* | 10/2015 | Wada ................. C03B 40/005 65/273 |
| 2015/0274585 A1 | 10/2015 | Rogers et al. |
| 2015/0321940 A1* | 11/2015 | Dannoux ............ C03B 23/0235 65/273 |
| 2015/0322270 A1 | 11/2015 | Amin et al. |
| 2015/0336357 A1 | 11/2015 | Kang et al. |
| 2015/0351272 A1* | 12/2015 | Wildner ............... H05K 5/0217 361/679.21 |
| 2015/0357387 A1 | 12/2015 | Lee et al. |
| 2016/0009066 A1 | 1/2016 | Nieber et al. |
| 2016/0009068 A1 | 1/2016 | Garner |
| 2016/0016849 A1 | 1/2016 | Allan |
| 2016/0031737 A1* | 2/2016 | Hoppe ................. C03B 23/0235 65/102 |
| 2016/0039705 A1 | 2/2016 | Kato et al. |
| 2016/0052241 A1 | 2/2016 | Zhang |
| 2016/0066463 A1 | 3/2016 | Yang et al. |
| 2016/0081204 A1 | 3/2016 | Park et al. |
| 2016/0083282 A1 | 3/2016 | Jouanno et al. |
| 2016/0083292 A1 | 3/2016 | Tabe et al. |
| 2016/0091645 A1 | 3/2016 | Birman et al. |
| 2016/0102015 A1 | 4/2016 | Yasuda et al. |
| 2016/0113135 A1 | 4/2016 | Kim et al. |
| 2016/0137550 A1* | 5/2016 | Murata ................. C03C 21/002 428/141 |
| 2016/0145148 A1* | 5/2016 | Imakita ................. C03C 23/00 501/39 |
| 2016/0176746 A1* | 6/2016 | Hunzinger ............ C03B 23/02 65/53 |
| 2016/0207290 A1* | 7/2016 | Cleary ............. B32B 17/10146 |
| 2016/0214889 A1 | 7/2016 | Garner et al. |
| 2016/0216434 A1 | 7/2016 | Shih et al. |
| 2016/0250982 A1 | 9/2016 | Fisher et al. |
| 2016/0252656 A1 | 9/2016 | Waldschmidt et al. |
| 2016/0259365 A1 | 9/2016 | Wang et al. |
| 2016/0272529 A1 | 9/2016 | Hong et al. |
| 2016/0297176 A1 | 10/2016 | Rickerl |
| 2016/0306451 A1 | 10/2016 | Isoda et al. |
| 2016/0313494 A1 | 10/2016 | Hamilton et al. |
| 2016/0354996 A1* | 12/2016 | Alder ............... B32B 17/10174 |
| 2016/0355091 A1* | 12/2016 | Lee ....................... B60K 35/00 |
| 2016/0355901 A1 | 12/2016 | Isozaki et al. |
| 2016/0375808 A1 | 12/2016 | Etienne et al. |
| 2017/0008377 A1 | 1/2017 | Fisher et al. |
| 2017/0021661 A1 | 1/2017 | Pelucchi |
| 2017/0059749 A1* | 3/2017 | Wakatsuki ........... G02B 5/0226 |
| 2017/0066223 A1 | 3/2017 | Notsu et al. |
| 2017/0081238 A1 | 3/2017 | Jones et al. |
| 2017/0088454 A1 | 3/2017 | Fukushima et al. |
| 2017/0094039 A1 | 3/2017 | Lu |
| 2017/0115944 A1 | 4/2017 | Oh et al. |
| 2017/0158551 A1 | 6/2017 | Bookbinder et al. |
| 2017/0160434 A1 | 6/2017 | Hart et al. |
| 2017/0185289 A1 | 6/2017 | Kim et al. |
| 2017/0190152 A1 | 7/2017 | Notsu et al. |
| 2017/0197561 A1* | 7/2017 | McFarland ............. B32B 17/10 |
| 2017/0213872 A1 | 7/2017 | Jinbo et al. |
| 2017/0217290 A1 | 8/2017 | Yoshizumi et al. |
| 2017/0217815 A1* | 8/2017 | Dannoux ............... C03B 23/025 |
| 2017/0240772 A1 | 8/2017 | Dohner et al. |
| 2017/0247291 A1 | 8/2017 | Hatano et al. |
| 2017/0262057 A1 | 9/2017 | Knittl et al. |

(56) References Cited

U.S. PATENT DOCUMENTS

| | | | |
|---|---|---|---|
| 2017/0263690 A1 | 9/2017 | Lee et al. | |
| 2017/0274627 A1 | 9/2017 | Chang et al. | |
| 2017/0283295 A1* | 10/2017 | Immerman | C03B 11/125 |
| 2017/0285227 A1 | 10/2017 | Chen et al. | |
| 2017/0305786 A1 | 10/2017 | Roussev et al. | |
| 2017/0327402 A1 | 11/2017 | Fujii et al. | |
| 2017/0334770 A1 | 11/2017 | Luzzato et al. | |
| 2017/0349473 A1 | 12/2017 | Moriya et al. | |
| 2018/0009197 A1 | 1/2018 | Gross et al. | |
| 2018/0014420 A1 | 1/2018 | Amin et al. | |
| 2018/0031743 A1 | 2/2018 | Wakatsuki et al. | |
| 2018/0050948 A1* | 2/2018 | Faik | C03B 23/0066 |
| 2018/0069053 A1 | 3/2018 | Bok | |
| 2018/0072022 A1 | 3/2018 | Tsai et al. | |
| 2018/0103132 A1 | 4/2018 | Prushinskiy et al. | |
| 2018/0111569 A1* | 4/2018 | Faik | B60K 35/00 |
| 2018/0112903 A1* | 4/2018 | Celik | F25D 17/045 |
| 2018/0122863 A1 | 5/2018 | Bok | |
| 2018/0125228 A1 | 5/2018 | Porter et al. | |
| 2018/0134232 A1 | 5/2018 | Helot | |
| 2018/0141850 A1 | 5/2018 | Dejneka et al. | |
| 2018/0147985 A1 | 5/2018 | Brown et al. | |
| 2018/0149777 A1 | 5/2018 | Brown | |
| 2018/0149907 A1 | 5/2018 | Gahagan et al. | |
| 2018/0164850 A1 | 6/2018 | Sim et al. | |
| 2018/0186674 A1* | 7/2018 | Kumar | B60R 13/02 |
| 2018/0188869 A1 | 7/2018 | Boggs et al. | |
| 2018/0208131 A1 | 7/2018 | Mattelet et al. | |
| 2018/0208494 A1 | 7/2018 | Mattelet et al. | |
| 2018/0210118 A1 | 7/2018 | Gollier et al. | |
| 2018/0215125 A1 | 8/2018 | Gahagan | |
| 2018/0245125 A1 | 8/2018 | Tsai et al. | |
| 2018/0282207 A1* | 10/2018 | Fujii | C03B 11/10 |
| 2018/0304825 A1 | 10/2018 | Mattelet et al. | |
| 2018/0319144 A1* | 11/2018 | Faik | B32B 37/12 |
| 2018/0324964 A1 | 11/2018 | Yoo et al. | |
| 2018/0345644 A1 | 12/2018 | Kang et al. | |
| 2018/0354988 A1* | 12/2018 | Tezcan | C12N 9/88 |
| 2018/0364760 A1 | 12/2018 | Ahn et al. | |
| 2018/0374906 A1 | 12/2018 | Everaerts et al. | |
| 2019/0034017 A1 | 1/2019 | Boggs et al. | |
| 2019/0039352 A1 | 2/2019 | Zhao et al. | |
| 2019/0039935 A1* | 2/2019 | Couillard | C03B 23/0302 |
| 2019/0069451 A1 | 2/2019 | Myers et al. | |
| 2019/0077262 A1* | 3/2019 | Benjamin | C03C 27/10 |
| 2019/0077337 A1 | 3/2019 | Gervelmeyer | |
| 2019/0135677 A1* | 5/2019 | Fukushi | C03C 3/087 |
| 2019/0152831 A1 | 5/2019 | An et al. | |
| 2019/0223309 A1 | 7/2019 | Amin et al. | |
| 2019/0295494 A1 | 9/2019 | Wang et al. | |
| 2019/0315648 A1* | 10/2019 | Kumar | E06B 3/549 |
| 2019/0329531 A1 | 10/2019 | Brennan et al. | |
| 2020/0064535 A1 | 2/2020 | Haan et al. | |
| 2020/0115272 A1* | 4/2020 | Li | C03C 3/093 |
| 2020/0123050 A1* | 4/2020 | Black | C03C 27/10 |
| 2020/0171952 A1* | 6/2020 | Couillard | C03B 23/0235 |
| 2020/0239351 A1* | 7/2020 | Bhatia | B32B 7/02 |
| 2020/0262744 A1* | 8/2020 | Fenton | C03C 15/02 |
| 2020/0325057 A1* | 10/2020 | Burdette | C03B 23/0252 |
| 2021/0031493 A1* | 2/2021 | Benjamin | B32B 17/10743 |
| 2021/0101820 A1* | 4/2021 | Frebourg | C03B 23/0357 |
| 2021/0122661 A1* | 4/2021 | Ogawa | C03B 23/0256 |
| 2021/0308953 A1* | 10/2021 | Kim | B29C 65/7882 |
| 2021/0323270 A1* | 10/2021 | Weikel | C03C 27/10 |
| 2022/0001650 A1* | 1/2022 | Dave | G01N 19/04 |
| 2022/0009201 A1* | 1/2022 | Kumar | B32B 7/12 |
| 2022/0017400 A1* | 1/2022 | Harris | C03C 3/085 |
| 2022/0024798 A1* | 1/2022 | Galgalikar | C03B 23/0357 |
| 2022/0169554 A1* | 6/2022 | Du Moulinet D'Hardemare | C03B 23/033 |
| 2022/0185718 A1* | 6/2022 | Renaud | C03B 35/161 |
| 2022/0204381 A1* | 6/2022 | Layouni | C03B 23/0256 |
| 2022/0227664 A1* | 7/2022 | Lambright | C03C 17/32 |
| 2022/0274368 A1* | 9/2022 | Burdette | B32B 7/12 |
| 2022/0306523 A1* | 9/2022 | Horn | C03B 23/023 |

FOREIGN PATENT DOCUMENTS

| | | |
|---|---|---|
| CN | 101600846 A | 12/2009 |
| CN | 101684032 A | 3/2010 |
| CN | 201989544 U | 9/2011 |
| CN | 102341356 A | 2/2012 |
| CN | 102464456 A | 5/2012 |
| CN | 103136490 A | 6/2013 |
| CN | 103587161 A | 2/2014 |
| CN | 203825589 U | 9/2014 |
| CN | 204111583 U | 1/2015 |
| CN | 102566841 B | 4/2015 |
| CN | 104656999 A | 5/2015 |
| CN | 104679341 A | 6/2015 |
| CN | 204463066 U | 7/2015 |
| CN | 104843976 A | 8/2015 |
| CN | 105118391 A | 12/2015 |
| CN | 105511127 A | 4/2016 |
| CN | 205239166 U | 5/2016 |
| CN | 105705330 A | 6/2016 |
| CN | 106256794 A | 12/2016 |
| CN | 205905907 U | 1/2017 |
| CN | 106458683 A | 2/2017 |
| CN | 206114596 U | 4/2017 |
| CN | 206114956 U | 4/2017 |
| CN | 107613809 A | 1/2018 |
| CN | 107757516 A | 3/2018 |
| CN | 108519831 A | 9/2018 |
| CN | 108550587 A | 9/2018 |
| CN | 108725350 A | 11/2018 |
| CN | 109135605 A | 1/2019 |
| CN | 109690662 A | 4/2019 |
| CN | 109743421 A | 5/2019 |
| DE | 4415787 A1 | 11/1995 |
| DE | 4415878 A1 | 11/1995 |
| DE | 69703490 T2 | 5/2001 |
| DE | 102004022008 A1 | 12/2004 |
| DE | 102004002208 A1 | 8/2005 |
| DE | 102009021938 A1 | 11/2010 |
| DE | 102010007204 A1 | 8/2011 |
| DE | 102013214108 A1 | 2/2015 |
| DE | 102014116798 A1 | 5/2016 |
| EP | 0076924 A2 | 4/1983 |
| EP | 0316224 A1 | 5/1989 |
| EP | 0347049 A2 | 12/1989 |
| EP | 0418700 A1 | 3/1991 |
| EP | 0423698 A1 | 4/1991 |
| EP | 0525970 A1 | 2/1993 |
| EP | 0664210 A1 | 7/1995 |
| EP | 1013622 A1 | 6/2000 |
| EP | 1031409 A1 | 8/2000 |
| EP | 1046493 A2 | 10/2000 |
| EP | 0910721 B1 | 11/2000 |
| EP | 1647663 A1 | 4/2006 |
| EP | 2236281 A1 | 10/2010 |
| EP | 2385630 A2 | 11/2011 |
| EP | 2521118 A2 | 11/2012 |
| EP | 2852502 A2 | 4/2015 |
| EP | 2933718 A1 | 10/2015 |
| EP | 3093181 A2 | 11/2016 |
| EP | 3100854 A1 | 12/2016 |
| EP | 3118174 A1 | 1/2017 |
| EP | 3118175 A1 | 1/2017 |
| EP | 3144141 A1 | 3/2017 |
| EP | 3156286 A1 | 4/2017 |
| EP | 3189965 A1 | 7/2017 |
| EP | 3288791 A1 | 3/2018 |
| EP | 3426614 A1 | 1/2019 |
| EP | 3532442 A1 | 9/2019 |
| FR | 2750075 A1 | 12/1997 |
| FR | 2918411 A1 | 1/2009 |
| FR | 3012073 A1 | 4/2015 |
| GB | 0805770 A | 12/1958 |
| GB | 0991867 A | 5/1965 |
| GB | 1319846 A | 6/1973 |
| GB | 2011316 A | 12/1977 |
| GB | 2281542 A | 3/1995 |
| JP | 55-154329 | 12/1980 |
| JP | 57-048082 A | 3/1982 |

(56) References Cited

FOREIGN PATENT DOCUMENTS

| | | |
|---|---|---|
| JP | 58-073681 A | 5/1983 |
| JP | 58-194751 | 11/1983 |
| JP | 59-076561 A | 5/1984 |
| JP | 63-089317 A | 4/1988 |
| JP | 63-190730 | 8/1988 |
| JP | 3059337 U | 6/1991 |
| JP | 03-228840 A | 10/1991 |
| JP | 04-119931 | 4/1992 |
| JP | 05-116972 A | 5/1993 |
| JP | 06-340029 A | 12/1994 |
| JP | 10-218630 A | 8/1998 |
| JP | 11-001349 A | 1/1999 |
| JP | 11-006029 A | 1/1999 |
| JP | 11-060293 A | 3/1999 |
| JP | 2000-260330 A | 9/2000 |
| JP | 2002-255574 A | 9/2002 |
| JP | 2003-500260 A | 1/2003 |
| JP | 2003-276571 A | 10/2003 |
| JP | 2003-321257 A | 11/2003 |
| JP | 2004-101712 A | 4/2004 |
| JP | 2004-284839 A | 10/2004 |
| JP | 2005-097109 A | 4/2005 |
| JP | 2006-181936 A | 7/2006 |
| JP | 2007-188035 A | 7/2007 |
| JP | 2007-197288 A | 8/2007 |
| JP | 2010-145731 A | 7/2010 |
| JP | 2012-111661 A | 6/2012 |
| JP | 2013-084269 A | 5/2013 |
| JP | 2014-126564 A | 7/2014 |
| JP | 2015-502901 A | 1/2015 |
| JP | 2015092422 A | 5/2015 |
| JP | 5748082 B2 | 7/2015 |
| JP | 2015-527946 A | 9/2015 |
| JP | 5796561 B2 | 10/2015 |
| JP | 2016-500458 A | 1/2016 |
| JP | 2016031696 A | 3/2016 |
| JP | 2016-517380 A | 6/2016 |
| JP | 2016-130810 A | 7/2016 |
| JP | 2016-144008 A | 8/2016 |
| JP | 05976561 B2 | 8/2016 |
| JP | 2016-530204 A | 9/2016 |
| JP | 2016173794 A | 9/2016 |
| JP | 2016-207200 A | 12/2016 |
| JP | 2016-539067 A | 12/2016 |
| JP | 2016203609 A | 12/2016 |
| JP | 6281825 B2 | 2/2018 |
| JP | 6340029 B2 | 6/2018 |
| KR | 2002-0019045 A | 3/2002 |
| KR | 10-0479282 B1 | 8/2005 |
| KR | 10-2008-0023888 A | 3/2008 |
| KR | 10-2013-0005776 A | 1/2013 |
| KR | 10-2014-0111403 A | 9/2014 |
| KR | 10-2015-0026911 A | 3/2015 |
| KR | 10-2015-0033969 A | 4/2015 |
| KR | 10-2015-0051458 A | 5/2015 |
| KR | 10-1550833 B1 | 9/2015 |
| KR | 10-2015-0121101 A | 10/2015 |
| KR | 10-2016-0118746 A | 10/2016 |
| KR | 10-1674060 B1 | 11/2016 |
| KR | 10-2016-0144008 A | 12/2016 |
| KR | 10-2017-0000208 A | 1/2017 |
| KR | 10-2017-0106263 A | 9/2017 |
| KR | 10-2017-0107124 A | 9/2017 |
| KR | 10-2017-0113822 A | 10/2017 |
| KR | 10-2017-0121674 A | 11/2017 |
| KR | 10-2018-0028597 A | 3/2018 |
| KR | 10-2018-0049484 A | 5/2018 |
| KR | 10-2018-0049780 A | 5/2018 |
| KR | 10-2019-0001864 A | 1/2019 |
| KR | 10-2019-0081264 A | 7/2019 |
| TW | 200704268 A | 1/2007 |
| TW | 201438895 A | 10/2014 |
| TW | 201546006 A | 12/2015 |
| TW | 201636309 A | 10/2016 |
| TW | 201637857 A | 11/2016 |
| VN | 58334 | 7/2018 |
| WO | 94/25272 A1 | 11/1994 |
| WO | 97/39074 A1 | 10/1997 |
| WO | 9801649 A1 | 1/1998 |
| WO | 00/73062 A1 | 12/2000 |
| WO | 2006/095005 A1 | 9/2006 |
| WO | 2007108861 A1 | 9/2007 |
| WO | 2008/042731 A1 | 4/2008 |
| WO | 2008/153484 A1 | 12/2008 |
| WO | 2009/072530 A1 | 6/2009 |
| WO | 2011/029852 A1 | 3/2011 |
| WO | 2011/144359 A1 | 11/2011 |
| WO | 2011/155403 A1 | 12/2011 |
| WO | 2012/005307 A1 | 1/2012 |
| WO | 2012058084 A2 | 5/2012 |
| WO | 2012/166343 A2 | 12/2012 |
| WO | 2013/072611 A1 | 5/2013 |
| WO | 2013/072612 A1 | 5/2013 |
| WO | 2013/174715 A1 | 11/2013 |
| WO | 2013/175106 A2 | 11/2013 |
| WO | 2014/085663 A1 | 6/2014 |
| WO | 2014/107640 A1 | 7/2014 |
| WO | 2014/172237 A2 | 10/2014 |
| WO | 2014/175371 A1 | 10/2014 |
| WO | 2015031594 A2 | 3/2015 |
| WO | 2015/055583 A1 | 4/2015 |
| WO | 2015/057552 A2 | 4/2015 |
| WO | 2015/084902 A1 | 6/2015 |
| WO | 2015/085283 A1 | 6/2015 |
| WO | 2015/141966 A1 | 9/2015 |
| WO | 2016/007815 A1 | 1/2016 |
| WO | 2016/007843 A1 | 1/2016 |
| WO | 2016/010947 A1 | 1/2016 |
| WO | 2016/010949 A1 | 1/2016 |
| WO | 2016044360 A1 | 3/2016 |
| WO | 2016/069113 A1 | 5/2016 |
| WO | 2016/070974 A1 | 5/2016 |
| WO | 2016/115311 A1 | 7/2016 |
| WO | 2016/125713 A1 | 8/2016 |
| WO | 2016/136758 A1 | 9/2016 |
| WO | 2016/173699 A1 | 11/2016 |
| WO | 2016/183059 A1 | 11/2016 |
| WO | 2016/195301 A1 | 12/2016 |
| WO | 2016/202605 A1 | 12/2016 |
| WO | 2016196531 A1 | 12/2016 |
| WO | 2016196546 A1 | 12/2016 |
| WO | 2017/015392 A1 | 1/2017 |
| WO | 2017/019851 A1 | 2/2017 |
| WO | 2017/023673 A1 | 2/2017 |
| WO | 2017106081 A1 | 6/2017 |
| WO | 2017/146866 A1 | 8/2017 |
| WO | 2017/158031 A1 | 9/2017 |
| WO | 2017155932 A1 | 9/2017 |
| WO | 2018/015392 A1 | 1/2018 |
| WO | 2018005646 A1 | 1/2018 |
| WO | 2018009504 A1 | 1/2018 |
| WO | 2018075853 A1 | 4/2018 |
| WO | 2018081068 A1 | 5/2018 |
| WO | 2018/102332 A1 | 6/2018 |
| WO | 2018125683 A1 | 7/2018 |
| WO | 2018/160812 A2 | 9/2018 |
| WO | 2018/200454 A1 | 11/2018 |
| WO | 2018/200807 A1 | 11/2018 |
| WO | 2018/213267 A1 | 11/2018 |
| WO | 2019/055469 A1 | 3/2019 |
| WO | 2019/055652 A1 | 3/2019 |
| WO | 2019/075065 A1 | 4/2019 |
| WO | 2019074800 A1 | 4/2019 |
| WO | 2019/151618 A1 | 8/2019 |

OTHER PUBLICATIONS

Datsiou K. C. (2017) Design and Performance of Cold Bent Glass (Year: 2017).*

Japanese Patent Application No. 2019-563525, Office Action, dated Jan. 26, 2022, 8 pages (4 pages of English Translation and 5 pages of Original Copy); Japanese Patent Office.

(56) References Cited

OTHER PUBLICATIONS

"Stainless Steel—Grade 410 (UNS S41000)", available online at <https://www.azom.com/article.aspx?ArticleID=970>, Oct. 23, 2001, 5 pages.
"Standard Test Method for Measurement of Glass Stress—Optical Coefficient", ASTM International, Designation C770-16, 2016.
Ashley Klamer, "Dead front overlays", Marking Systems, Inc., Jul. 8, 2013, 2 pages.
ASTM C1279-13 "Standard Test Method for Non-Destructive Photoelastic Measurement of Edge and Surface Stresses in Annealed, Heat-Strengthened, and Fully Tempered Flat Glass"; Downloaded Jan. 24, 2018; 11 Pages.
ASTM C1422/C1422M-10 "Standard Specification for Chemically Strengthened Flat Glass"; Downloaded Jan. 24, 2018; 5 pages.
ASTM Standard C770-98 (2013), "Standard Test Method for Measurement of Glass Stress-Optical Coefficient".
Burchardt et al., (Editorial Team), Elastic Bonding: The basic principles of adhesive technology and a guide to its cost-effective use in industry, 2006, 71 pages.
Datsiou et al., "Behaviour of cold bent glass plates during the shaping process", Engineered Transparency. International Conference atglasstec, Dusseldorf, Germany, Oct. 21 and 22, 2014, 9 pages.
Engineering ToolBox, "Coefficients of Linear Thermal Expansion", available online at <https://www.engineeringtoolbox.com/linear-expansion-coefficients-d_95.html>, 2003, 9 pages.
Fauercia "Intuitive HMI for a Smart Life on Board" (2018); 8 Pages http://www.faurecia.com/en/innovation/smart-life-board/intuitive-HMI.
Faurecia: Smart Pebbles, Nov. 10, 2016 (Nov. 10, 2016), XP055422209, Retrieved from the Internet: URL:https://web.archive.org/web/20171123002248/http://www.faurecia.com/en/innovation/discover-our-innovations/smart-pebbles [retrieved on Nov. 23, 2017].
Ferwerda et al., "Perception of sparkle in anti-glare display screens", Journal of the SID, vol. 22, Issue 2, 2014, pp. 129-136.
Galuppi et al; "Buckling Phenomena in Double Curved Cold-Bent Glass;" Intl. J. Non-Linear Mechanics 64 (2014) pp. 70-84.
Galuppi L et al: "Optimal cold bending of laminated glass", Jan. 1, 2007 vol. 52, No. 1/2 Jan. 1, 2007 (Jan. 1, 2007), pp. 123-146.
Gollier et al., "Display Sparkle Measurement and Human Response", SID Symposium Digest of Technical Papers, vol. 44, Issue 1, 2013, pp. 295-297.
Indian Patent Application No. 201917031293 Office Action dated May 24, 2021; 6 pages; Indian Patent Office.
Jalopnik, "This Touch Screen Car Interior is a Realistic Vision of the Near Future", jalopnik.com, Nov. 19, 2014, https://jalopnik.com/this-touch-screen-car-interior-is-a-realistic-vision-of-1660846024 (Year: 2014).
Li et al., "Effective Surface Treatment on the Cover Glass for Autointerior Applications", SID Symposium Digest of Technical Papers, vol. 47, 2016, pp. 467-469.
Pambianchi et al; "Corning Incorporated: Designing a New Future With Glass and Optics" Chapter 1 In "Materials Research for Manufacturing: an Industrial Perspective of Turning Materials Into New Products"; Springer Series Material Science 224, p. 12 (2016).
Pegatron Corp. "Pegaton Navigate the Future"; Ecockpit/Center CNSOLE Work Premiere; Automotive World; Downloaded Jul. 12, 2017; 2 Pages.
Photodon, "Screen Protectors For Your Car's Navi System That You're Gonna Love", photodon.com, Nov. 6, 2015, https://www.photodon.com/blog/archives/screen-protectors-for-your-cars-navi-system-that-youre-gonna-love) (Year: 2015).
Product Information Sheet: Corning® Gorilla® Glass 3 with Native Damage Resistance™, Corning Incorporated, 2015, Rev: F_090315, 2 pages.
Scholze, H., "Glass-Water Interactions", Journal of Non-Crystalline Solids vol. 102, Issues 1-3, Jun. 1, 1988, pp. 1-10.
Stattler; "New Wave-Curved Glass Shapes Design"; Glass Magazine; (2013); 2 Pages.
Stiles Custom Metal, Inc., Installation Recommendations, 2010 https://stilesdoors.com/techdata/pdf/Installation%20Recommendations%20HM%20Windows,%20Transoms%20&%>OSidelites%200710.pdf) (Year: 2010).
Tomozawa et al., "Hydrogen-to-Alkali Ratio in Hydrated Alkali Aluminosilicate Glass Surfaces", Journal of Non-Crystalline Solids, vol. 358, Issue 24, Dec. 15, 2012, pp. 3546-3550.
Zhixin Wang, Polydimethylsiloxane mechanical properties measured by macroscopic compression and nanoindentation techniques, Graduate Theses and Dissertations, University of South Florida, 2011, 79 pages.
Author Unknown; "Stress Optics Laboratory Practice Guide" 2012; 11 Pages.
Belis et al; "Cold Bending of Laminated Glass Panels"; Heron vol. 52 (2007) No. 1/2; 24 Pages.
Doyle et al; "Manual on Experimental Stress Analysis; Fifth Edition, Society for Experimental Mechanics; Unknown Year; 31 Pages".
Elziere; "Laminated Glass: Dynamic Rupture of Adhesion"; Polymers; Universite Pierre Et Marie Curie—Paris VI, 2016. English; 181 Pages.
Fildhuth et al; "Considerations Using Curved, Heat or Cold Bent Glass for Assembling Full Glass Shells", Engineered Transparency, International Conference at Glasstec, Dusseldorf, Germany, Oct. 25 and 26, 2012; 11 Pages.
Fildhuth et al; "Interior Stress Monitoring of Laminated Cold Bent Glass With Fibre Bragg Sensors"; Challenging Glass 4 & Cost Action TU0905 Final Conference Louter, Bos & Belis (Eds), 2014; 8 Pages.
Fildhuth et al; "Layout Strategies and Optimisation of Joint Patterns in Full Glass Shells", Challenging Glass 3—Conference on Architectural and Structural Applications of Glass, Bos, Louter, Nijsse, Veer (Eds.), Tu Delft, Jun. 2012; 13 Pages.
Fildhuth et al; "Recovery Behaviour of Laminated Cold Bent Glass—Numerical Analysis and Testing"; Challenging Glass 4 & Cost Action TU0905 Final Conference—Louter, Bos & Beus (Eds) (2014); 9 Pages.
Fildhuth; "Design and Monitoring of Cold Bent Lamination—Stabilised Glass"; ITKE 39 (2015) 270 Pages.
Galuppi et al; "Cold-Lamination-Bending of Glass: Sinusoidal is Better Than Circular", Composites Part B 79 (2015) 285-300.
Galuppi et al; "Optical Cold Bending of Laminated Glass"; Internaitonal Journal of Solids and Structures, 67-68 (2015) pp. 231-243.
Millard; "Bending Glass in the Parametric Age"; Enclos; (2015); pp. 1-6; http://www.enclos.com/site-info/news/bending-glass-in-the-parametric-age.
Neugebauer et al; "Let Thin Glass in the Faade Move Thin Glass-New Possibilities for Glass in the Faade", Conference Paper Jun. 2018; 12 Pages.
Vakar et al; "Cold Bendable, Laminated Glass—New Possibilities in Design"; Structural Engineering International; Feb. 2004; Structural Design in Glass; pp. 95-97.
Weide; "Graduation Plan"; Jan. 2017; 30 Pages.
Werner; "Display Materials and Processes," Information Display; May 2015; 8 Pages.
Byun et al; "A Novel Route for Thinning of LCD Glass Substrates"; SID 06 Digest; pp. 1786-1788, v37, 2006.
Galuppi et al; "Large Deformations and Snap-Through Instability of Cold-Bent Glass"; Challenging Glass 4 & Cost Action TU0905 Final Conference; (2014) pp. 681-689.
International Search Report and Written Opinion of the International Searching Authority; PCT/US2018/032700; dated Aug. 14, 2018; 12 Pages; European Patent Office.

\* cited by examiner

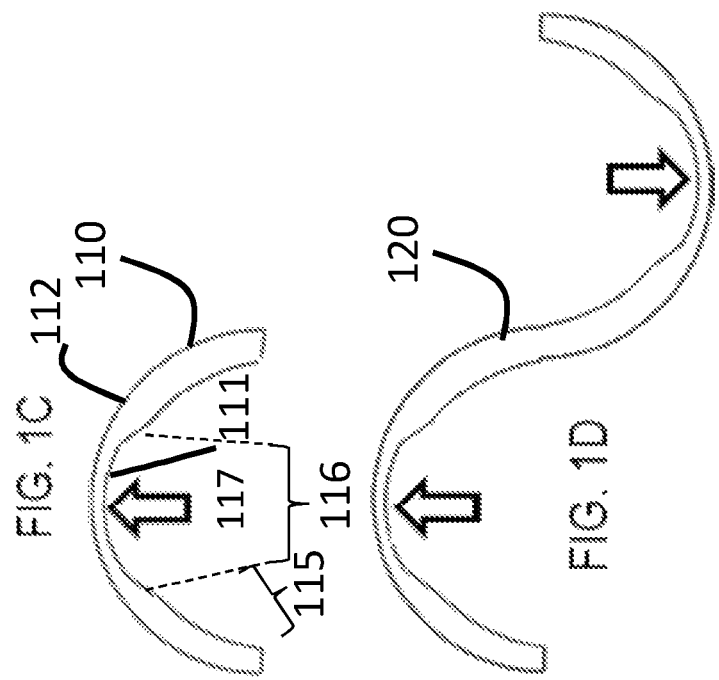
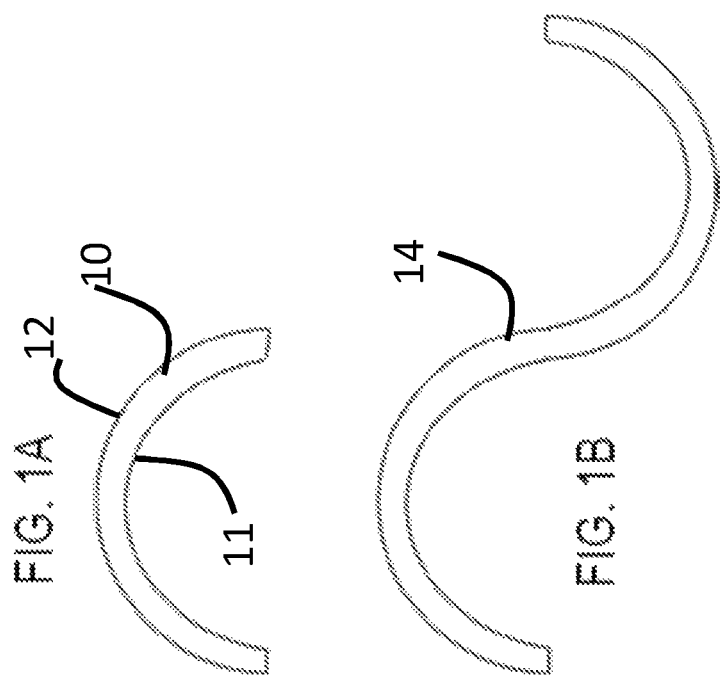

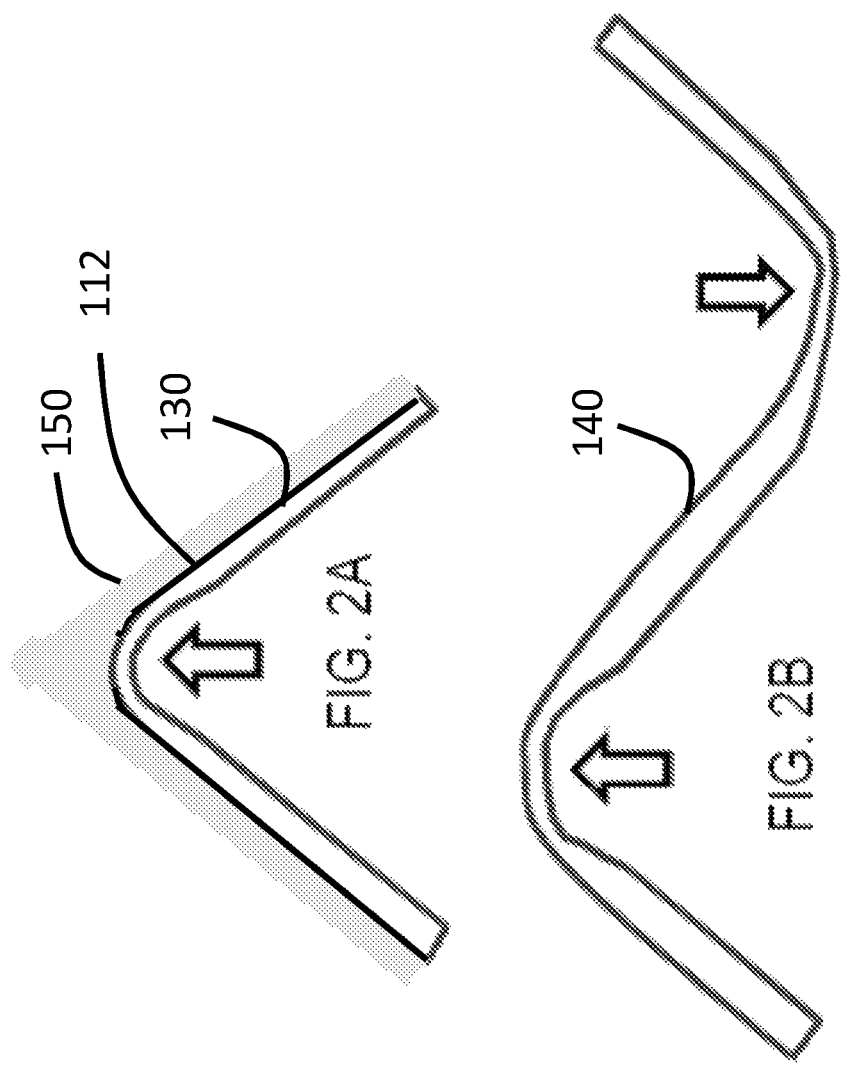

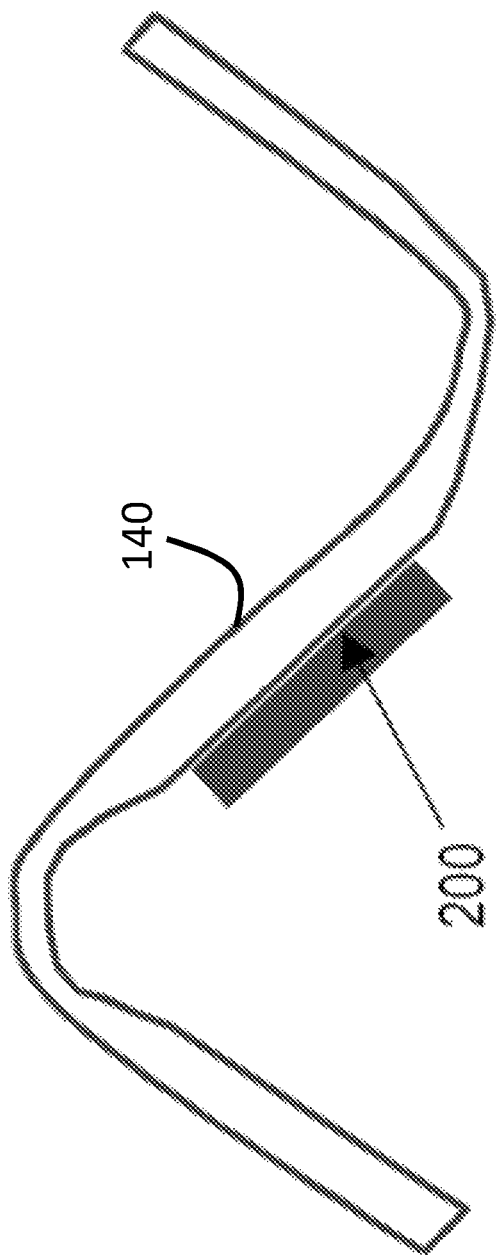

CONTOURED GLASS ARTICLES AND METHODS OF MAKING THE SAME

CROSS REFERENCE TO RELATED APPLICATIONS

This application is a national stage application under 35 U.S.C. § 371 of International Application No. PCT/US2018/032700, filed on May 15, 2018, which claims the benefit of priority under 35 U.S.C. § 119 of U.S. Provisional Application Ser. No. 62/506,024 filed on May 15, 2017, the content of which is relied upon and incorporated herein by reference in its entirety.

BACKGROUND

The present disclosure relates generally to the field of three-dimensional (3D) shaped glass for various applications including for automotive interiors.

There is interest in automotive displays having curved or conformal shapes ("conformal displays") that can be integrated into the dashboard, console, or other auto interior locations that have a curved surface or partially curved surface. Such displays can include liquid crystal displays (LCDs), organic light-emitting diode (OLED) displays, micro light emitting diode (microLED) displays, and other displays. In addition, there is also interest in using a contoured cover glass to provide additional mechanical stability and reliability to the automotive displays.

Conformal shapes in displays and cover glass in automotive applications have been limited to shaping the cover glass, while the underlying displays are flat and rigid. The cover glass has been shaped by either hot forming or cold bending processes. Hot forming heats the glass to a temperature greater than its softening point to permanently bend the glass to the desired shape. Hot form processes can produce a variety of 3D shapes but adds significant cost. Moreover, hot formed glass need to be thermally shaped and then strengthened (e.g., by an ion exchange process). In contrast, in cold bending is performed at significantly lower temperatures (often room temperature); however, the achievable bend radius and shapes can be limited when glass sheets of constant thicknesses are used (i.e., such shapes may be limited to basic U- and S-curves with larger bend radii). More complex shapes create significant stress in the cold bent glass. moreover, decreasing the bend radius creates high bend stress in cold bent glass and requires more substantial mechanical frames or a strong adhesive to hold the cold bent glass in the correct shape due to overall stiffness.

Accordingly, there is a need for conformal displays and/or contoured cover glass shapes having high display quality and mechanical reliability.

SUMMARY

The present disclosure described embodiments of a method of making contoured glass articles and embodiments of the resulting contoured glass articles.

In one or more embodiments, the method of making a contoured glass article comprises cold bending a flat glass sheet having first and second opposing major surfaces, at least one region having a first thickness, and at least one region having a second thickness, to produce cold bent glass sheet having at least one bend region along a portion of the at least one region having the second thickness; and restraining the cold bent glass sheet to produce the contoured glass article, wherein the first thickness is greater than the second thickness. In one or more specific embodiments, cold bending and the retaining the cold bent glass sheet are accomplished sequentially or simultaneously.

In one or more embodiments, the contoured glass article comprising: a cold bent glass sheet having first and second opposing major surfaces, at least one region having a first thickness, at least one region having a second thickness, and at least one bend region along a portion of the at least one region having the second thickness, wherein the first thickness is greater than the second thickness.

BRIEF DESCRIPTION OF THE DRAWINGS

FIGS. 1A and 1B are cross-sectional views of cold bent glass sheets having uniform thickness and FIGS. 1C and 1D are cross-sectional views of cold bent glass sheets having one or two localized thinned and cold-bent regions (each indicated by an arrow), according to one or more embodiments of this disclosure.

FIGS. 2A and 2B are cross-sectional views of cold bent glass sheets having one or two localized thinned and cold-bent regions (each indicated by an arrow), according to one or more embodiments of this disclosure.

FIG. 3B shows the cold bent glass sheet of FIG. 2D (with a localized thinned region) that can accommodate a functional item such as a display because of reduced curvature or superior flatness in the thinned region for attaching the functional item), according to one or more embodiments of this disclosure.

DETAILED DESCRIPTION

Figure 3A:
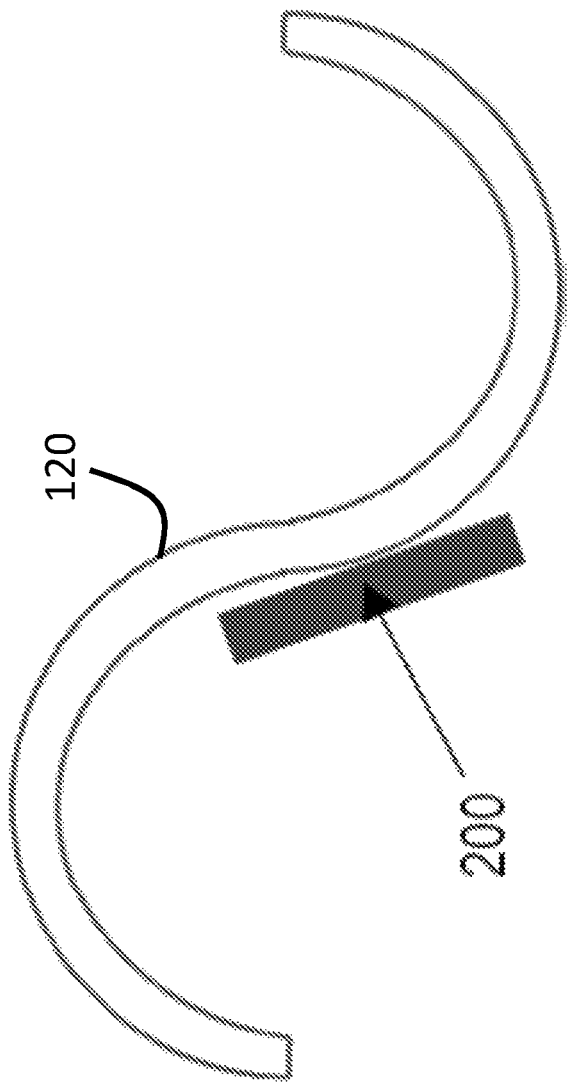
FIG. 3A shows the cold-bent glass sheet of FIG. 2B (without a localized thinned region) that cannot neatly accommodate a functional item such as a display.

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

Definitions

"Cold bending," "cold bend," and like terms refer to bending a glass article at a temperature below the glass transition temperature (T) of the glass. Cold-bending can occur, for example, at below 800° C., such as at 700, 600, 500, 400, 300, 280, 200, 100, 50, and 25° C., including intermediate values and ranges. A feature of a cold-bent glass article is asymmetric surface compressive stress between a first major surface 11, 111 and the second major surface 12, 112 as shown in FIGS. 1A and 1C. In one or more embodiments, prior to the cold-bending process or being cold-bent, the respective compressive stresses in the first major surface 11, 111 and the second major surface 12, 112 of the glass article are substantially equal. In one or more embodiments in which the glass article is unstrengthened, the first major surface 11, 111 and the second major surface 12, 112 exhibit no appreciable compressive stress, prior to cold-bending. In one or more embodiments in which the glass article is strengthened (as described herein), the first major surface 11, 111 and the second major surface 12, 112 exhibit substantially equal compressive stress with respect to one another, prior to cold-bending. In one or more embodiments, after cold-bending (shown, for example, in FIGS. 1A and 1C), the compressive stress on the surface having a concave shape after bending (e.g., first major surface 11, 111 in FIGS. 1A and 1C) increases. In other words, the compressive stress on the concave surface (e.g., first major surface 11, 111) is greater after cold-bending than before cold-bending. Without being bound by theory, the cold-bending process increases the compressive stress of the glass article being shaped to compensate for tensile stresses imparted during bending and/or forming operations. In one or more embodiments, the cold-bending process causes the concave surface (first major surface 11, 111) to experience compressive stresses, while the surface forming a convex shape (i.e., the second major surface 12, 112 in FIGS. 12, 112) after cold-bending experiences tensile stresses. The tensile stress experienced by the convex surface (i.e., the second major surface 12, 112) following cold-bending results in a net decrease in surface compressive stress, such that the compressive stress in convex surface (i.e., the second major surface 12, 112) of a strengthened glass article following cold-bending is less than the compressive stress on the same surface (i.e., second major surface 12, 112) when the glass article is flat. When a strengthened glass article is utilized, the first major surface and the second major surface comprise a compressive stress that is substantially equal to one another prior to cold-bending, and thus the first major surface can experience greater tensile stress during cold-bending without risking fracture. This allows for the strengthened glass article to conform to more tightly curved surfaces or shapes.

"IOX," "IOXing," "IOX'ed," "ion-exchange," "ion-exchanging," or like terms refer to the ion exchange of ions, partially or completely, on at least a portion of the glass surface, on one or both sides as specified, with different ions such as an ion having a larger atomic radius compared to the exchanged ions such as $K^+$ ions exchanged (i.e., replacing) for $Na^+$ ions.

"Bend radius," "radius," or like terms refer to is the minimum radius measured to the inside curvature, alternatively or additionally, the maximum bend one can bend a glass sheet without damaging it or shortening its life. The smaller the bend radius, the greater is the material flexibility. A related term is "radius of curvature". As the radius of curvature of the bent part or piece decreases, the curvature increases; a large radius of curvature represents a low curvature and a small radius of curvature represents high curvature.

Specific and preferred values disclosed for components, ingredients, additives, dimensions, conditions, times, and like aspects, and ranges thereof, are for illustration only; they do not exclude other defined values or other values within defined ranges. The composition and methods of the disclosure can include any value or any combination of the values, specific values, more specific values, and preferred values described herein, including explicit or implicit intermediate values and ranges.

A first aspect of this disclosure pertains to a contoured glass article as shown in FIGS. 1C-1D, 2A-2B, 3B and 4. As used herein, the phrase "contoured glass article" refers to a glass article that has been bent into a curved shape. The contoured glass article can be curved via cold bending as described herein. In one or more embodiments, the contoured glass article includes a cold bent glass sheet having a first major surface 111 (as shown in FIG. 1C), a second major surface 112 opposing the first major surface (or second opposing major surface), at least one region having a first thickness 115, at least one region having a second thickness 116, and at least one bend region 117 along a portion of the at least one region having the second thickness. In one or more embodiments, the first thickness 115 is greater than the second thickness 116.

In one or more embodiments, the contoured glass article further includes a frame 150 (as shown in FIG. 2A) attached to the second major surface 112 to retain the at least one bend region. In one or more alternative embodiments, the frame 150 maybe attached to the first major surface 111.

In one or more embodiments, the contoured glass article (or the flat glass sheet that is used to form the contoured glass article) has a first thickness 115 that is about 2 mm or less, or about 1.5 mm or less. For example, the first thickness maybe in a range from about 0.01 mm to about 1.5 mm, 0.02 mm to about 1.5 mm, 0.03 mm to about 1.5 mm, 0.04 mm to about 1.5 mm, 0.05 mm to about 1.5 mm, 0.06 mm to about 1.5 mm, 0.07 mm to about 1.5 mm, 0.08 mm to about 1.5 mm, 0.09 mm to about 1.5 mm, 0.1 mm to about 1.5 mm, from about 0.15 mm to about 1.5 mm, from about 0.2 mm to about 1.5 mm, from about 0.25 mm to about 1.5 mm, from about 0.3 mm to about 1.5 mm, from about 0.35 mm to about 1.5 mm, from about 0.4 mm to about 1.5 mm, from about 0.45 mm to about 1.5 mm, from about 0.5 mm to about 1.5 mm, from about 0.55 mm to about 1.5 mm, from about 0.6 mm to about 1.5 mm, from about 0.65 mm to about 1.5 mm, from about 0.7 mm to about 1.5 mm, from about 0.01 mm to about 1.4 mm, from about 0.01 mm to about 1.3 mm, from about 0.01 mm to about 1.2 mm, from about 0.01 mm to about 1.1 mm, from about 0.01 mm to about 1.05 mm, from about 0.01 mm to about 1 mm, from about 0.01 mm to about 0.95 mm, from about 0.01 mm to about 0.9 mm, from about 0.01 mm to about 0.85 mm, from about 0.01 mm to about 0.8 mm, from about 0.01 mm to about 0.75 mm, from about 0.01 mm to about 0.7 mm, from about 0.01 mm to about 0.65 mm, from about 0.01 mm to about 0.6 mm, from about 0.01 mm to about 0.55 mm, from about 0.01 mm to about 0.5 mm, from about 0.01 mm to about 0.4 mm, from about 0.01 mm to about 0.3 mm, from about 0.01 mm to about 0.2 mm, from about 0.01 mm to about 0.1 mm, from about 0.04 mm to about 0.07 mm, from about 0.1 mm to about 1.4 mm, from about 0.1 mm to about 1.3 mm, from about 0.1 mm to about 1.2 mm, from about 0.1 mm to about 1.1 mm, from about 0.1 mm to about 1.05 mm, from about 0.1 mm to about 1 mm, from about 0.1 mm to about 0.95 mm, from about 0.1 mm to about 0.9 mm, from about 0.1 mm to about 0.85 mm, from about 0.1 mm to about 0.8 mm, from about 0.1 mm to about 0.75 mm, from about 0.1 mm to about 0.7 mm, from about 0.1 mm to about 0.65 mm, from about 0.1 mm to about 0.6 mm, from about 0.1 mm to about 0.55 mm, from about 0.1 mm to about 0.5 mm, from about 0.1 mm to about 0.4 mm, or from about 0.3 mm to about 0.7 mm.

In one or more embodiments, the contoured glass article (and/the flat glass sheet that is used to form the contoured glass article) has a second thickness 116 that is less than the first thickness. In one or more embodiments, the first thickness is in a range from about 500 micrometers to about 2 mm, and the second thickness is in a range from about 10% to 90% of the first thickness (e.g., from about 10% to about 85%, from about 10% to about 80%, from about 10% to about 75%, from about 10% to about 70%, from about 10% to about 65%, from about 10% to about 60%, from about 10% to about 55%, from about 10% to about 50%, from about 10% to about 45%, from about 20% to about 90%, from about 25% to about 90%, from about 30% to about 90%, from about 35% to about 90%, from about 40% to about 90%, from about 45% to about 90%, from about 50% to about 90%, from about 55% to about 90%, from about 60% to about 90%, or from about 65% to about 90%). In one or more embodiments, the first thickness is in a range from greater than about 500 micrometers to about 2 mm, and the second thickness is in a range from about 300 micrometers to less than 500 micrometers. In some embodiments, the regions of first thickness can have a size having at least one linear dimension of from greater than or equal to one of 5, 10, 20, 50, 100 mm, and like thicknesses, including intermediate values and ranges. The regions of second thickness can have a size having at least one linear dimension of from greater than or equal to one of: 5, 10, 20, 50, 100 mm, and like thicknesses, including intermediate values and ranges. The thickness transition, for example a taper or step(s), between a first thickness and a second thickness can occur with a linear dimension of less than or equal to one of from 1, 10, 20, 50, 100 microns, and 1, 5, 10, 50, 100 mm, and like transition thicknesses, including intermediate values and ranges.

In one or more embodiments, the contoured article (and/or the flat glass sheet that is used to form the contoured glass article) has a, width (W) defined as a first maximum dimension of one of the first or second major surfaces, and a length (L) defined as a second maximum dimension of one of the first or second surfaces orthogonal to the width. The width and/or length of the flat glass sheet may be greater than width and/or length of the same glass sheet after cold bending into the contoured glass article because of the curvature in the contoured glass article.

In one or more embodiments, the contoured glass article (and/or the flat glass sheet that is used to form the contoured glass article) has a width (W) in a range from about 5 cm to about 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 110 cm, from about 5 cm to about 100 cm, from about 5 cm to about 90 cm, from about 5 cm to about 80 cm, or from about 5 cm to about 75 cm.

In one or more embodiments, the contoured glass article (and/or the flat glass sheet that is used to form the contoured glass article) has a length (L) in a range from about 5 cm to about 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 110 cm, from about 5 cm to about 100 cm, from about 5 cm to about 90 cm, from about 5 cm to about 80 cm, or from about 5 cm to about 75 cm.

In one or more embodiments, the contoured glass article (and/or the flat glass sheet that is used to form the contoured glass article) has a surface area in a range from about 10 cm$^2$ to about 50,000 cm$^2$.

Suitable glass compositions for use in the contoured glass article (or flat glass sheet used to form the contoured glass article) include soda lime glass, aluminosilicate glass, borosilicate glass, boroaluminosilicate glass, alkali-containing aluminosilicate glass, alkali-containing borosilicate glass, and alkali-containing boroaluminosilicate glass. In one or more embodiments, the contoured glass article (or flat glass sheet used to form the contoured glass article) may be a single composition layer or may include multiple layers of different compositions and thicknesses.

In one or more embodiments, at least one of first major surface 111, and the second major surface 112 may be unstrengthened, annealed or heat strengthened. In embodiments in which at least one of first major surface 111, and the second major surface 112 may be unstrengthened, annealed or heat strengthened, such surface may exhibit a surface compressive stress of less than 120 MPa, less than 100 MPa, less than 75 MPa or less than 50 MPa). In one or more embodiments, at least one of the first major surface 111, and the second major surface 112 may exhibit no ion-exchanged surfaces.

In one or more embodiments, at least one of the first and second major surfaces or both the first and second major surfaces of the contoured glass article is strengthened. In one or more embodiments, the flat glass sheet used to form the contoured glass article may be strengthened before forming into the contoured glass article. Such strength characteristics may be present in the final contoured glass article (with any additional characteristics attributable to cold bending such as the different in surface compressive stress between the first major surface and the second major surface, as described herein).

In one or more embodiments, the strengthened contoured glass article may include a compressive stress that extends from a surface (typically one of or both the first and second major surfaces) to a depth of compression or depth of compressive stress layer (DOC). The compressive stress at the surface is referred to as the surface CS. The CS regions are balanced by a central portion exhibiting a tensile stress.

At the DOC, the stress crosses from a compressive stress to a tensile stress. The compressive stress and the tensile stress are provided herein as absolute values.

In one or more embodiments, the contoured glass article may be strengthened by any one or combinations of a thermal strengthening process, a chemical strengthening process and a mechanical strengthening process. In one or more embodiments, the contoured glass article (or flat glass sheet) may be mechanically strengthened by utilizing a mismatch of the coefficient of thermal expansion between portions of the article to create a compressive stress region and a central region exhibiting a tensile stress. In some embodiments, the contoured glass article (or flat glass sheet) may be thermally strengthened by heating the glass to a temperature above the glass transition point and then rapidly quenching.

In one or more embodiments, the contoured glass article (or flat glass sheet) may be chemically strengthened by ion exchange. In the ion exchange process, ions at or near the surface of the contoured glass article (or flat glass sheet) are replaced by—or exchanged with—larger ions having the same valence or oxidation state. In embodiments in which the contoured glass article comprises an alkali aluminosilicate glass, ions in the surface layer of the article and the larger ions are monovalent alkali metal cations, such as Li+, Na+, K+, Rb+, and Cs+. Alternatively, monovalent cations in the surface layer may be replaced with monovalent cations other than alkali metal cations, such as Ag+ or the like. In such embodiments, the monovalent ions (or cations) exchanged into the contoured glass article (or flat glass sheet) generate a stress. It should be understood that any alkali metal oxide containing glass article (or flat glass sheet) can be chemically strengthened by an ion exchange process.

Ion exchange processes are typically carried out by immersing a glass article (or flat glass sheet) in a molten salt bath (or two or more molten salt baths) containing the larger ions to be exchanged with the smaller ions in the glass article (or flat glass sheet). It should be noted that aqueous salt baths may also be utilized. In addition, the composition of the bath(s) may include more than one type of larger ion (e.g., Na+ and K+) or a single larger ion. It will be appreciated by those skilled in the art that parameters for the ion exchange process, including, but not limited to, bath composition and temperature, immersion time, the number of immersions of the glass article in a salt bath (or baths), use of multiple salt baths, additional steps such as annealing, washing, and the like, are generally determined by the composition of the glass article (including the structure of the article and any crystalline phases present) and the desired DOC and CS of the glass article that results from strengthening. Exemplary molten bath composition may include nitrates, sulfates, and chlorides of the larger alkali metal ion. Typical nitrates include KNO3, NaNO3, LiNO3, NaSO4 and combinations thereof. The temperature of the molten salt bath typically is in a range from about 380° C. up to about 450° C., while immersion times range from about 15 minutes up to about 100 hours depending on glass article (or flat glass sheet) thickness, bath temperature and glass (or monovalent ion) diffusivity. However, temperatures and immersion times different from those described above may also be used.

In one or more embodiments, the glass articles (or flat glass sheet) may be immersed in a molten salt bath of 100% NaNO3, 100% KNO3, or a combination of NaNO3 and KNO3 having a temperature from about 370° C. to about 480° C. In some embodiments, the glass article (or flat glass sheet) may be immersed in a molten mixed salt bath including from about 1% to about 99% KNO3 and from about 1% to about 99% NaNO3. In one or more embodiments, the glass article (or flat glass sheet) may be immersed in a second bath, after immersion in a first bath. The first and second baths may have different compositions and/or temperatures from one another. The immersion times in the first and second baths may vary. For example, immersion in the first bath may be longer than the immersion in the second bath.

In one or more embodiments, the glass article (or flat glass sheet) may be immersed in a molten, mixed salt bath including NaNO3 and KNO3 (e.g., 49%/51%, 50%/50%, 51%/49%) having a temperature less than about 420° C. (e.g., about 400° C. or about 380° C.), for less than about 5 hours, or even about 4 hours or less.

Ion exchange conditions can be tailored to provide a "spike" or to increase the slope of the stress profile at or near the surface of the resulting glass article (or flat glass sheet). The spike may result in a greater surface CS value. This spike can be achieved by single bath or multiple baths, with the bath(s) having a single composition or mixed composition, due to the unique properties of the glass compositions used in the glass articles (or flat glass sheet) described herein.

In one or more embodiments, where more than one monovalent ion is exchanged into the glass article (or flat glass sheet), the different monovalent ions may exchange to different depths within the glass article (and generate different magnitudes stresses within the glass article at different depths). The resulting relative depths of the stress-generating ions can be determined and cause different characteristics of the stress profile.

CS is measured using those means known in the art, such as by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method. As used herein CS may be the "maximum compressive stress" which is the highest compressive stress value measured within the compressive stress layer. In some embodiments, the maximum compressive stress is located at the surface of the glass article. In other embodiments, the maximum compressive stress may occur at a depth below the surface, giving the compressive profile the appearance of a "buried peak."

DOC may be measured by FSM or by a scattered light polariscope (SCALP) (such as the SCALP-04 scattered light polariscope available from Glasstress Ltd., located in Tallinn Estonia), depending on the strengthening method and conditions. When the glass article is chemically strengthened by an ion exchange treatment, FSM or SCALP may be used depending on which ion is exchanged into the glass article. Where the stress in the glass article is generated by exchanging potassium ions into the glass article, FSM is used to measure DOL. Where the stress is generated by exchanging sodium ions into the glass article, SCALP is used to measure DOL. Where the stress in the glass article is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass articles is measured by FSM. Central tension or CT is the maximum tensile stress and is measured by SCALP.

In one or more embodiments, the glass article (or flat glass sheet) maybe strengthened to exhibit a DOC that is described a fraction of the thickness t of the glass article (as described herein). For example, in one or more embodiments, the DOC may be equal to or greater than about 0.05 t, equal to or greater than about 0.1 t, equal to or greater than about 0.11 t, equal to or greater than about 0.12 t, equal to or greater than about 0.13 t, equal to or greater than about 0.14 t, equal to or greater than about 0.15 t, equal to or greater than about 0.16 t, equal to or greater than about 0.17 t, equal to or greater than about 0.18 t, equal to or greater than about 0.19 t, equal to or greater than about 0.2 t, equal to or greater than about 0.21 t. In some embodiments, the DOC may be in a range from about 0.08 t to about 0.25 t, from about 0.09 t to about 0.25 t, from about 0.18 t to about 0.25 t, from about 0.1 It to about 0.25 t, from about 0.12 t to about 0.25 t, from about 0.13 t to about 0.25 t, from about 0.14 t to about 0.25 t, from about 0.15 t to about 0.25 t, from about 0.08 t to about 0.24 t, from about 0.08 t to about 0.23 t, from about 0.08 t to about 0.22 t, from about 0.08 t to about 0.21 t, from about 0.08 t to about 0.2 t, from about 0.08 t to about 0.19 t, from about 0.08 t to about 0.18 t, from about 0.08 t to about 0.17 t, from about 0.08 t to about 0.16 t, or from about 0.08 t to about 0.15 t. In some instances, the DOC may be about 20 μm or less. In one or more embodiments, the DOC may be about 40 μm or greater (e.g., from about 40 μm to about 300 μm, from about 50 μm to about 300 μm, from about 60 μm to about 300 μm, from about 70 μm to about 300 μm, from about 80 μm to about 300 μm, from about 90 μm to about 300 μm, from about 100 μm to about 300 μm, from about 110 μm to about 300 μm, from about 120 μm to about 300 μm, from about 140 μm to about 300 μm, from about 150 μm to about 300 μm, from about 40 μm to about 290 μm, from about 40 μm to about 280 μm, from about 40 μm to about 260 μm, from about 40 μm to about 250 μm, from about 40 μm to about 240 μm, from about 40 μm to about 230 μm, from about 40 μm to about 220 μm, from about 40 μm to about 210 μm, from about 40 μm to about 200 μm, from about 40 μm to about 180 μm, from about 40 μm to about 160 μm, from about 40 μm to about 150 μm, from about 40 μm to about 140 μm, from about 40 μm to about 130 μm, from about 40 μm to about 120 μm, from about 40 μm to about 110 μm, or from about 40 μm to about 100 μm.

In one or more embodiments, the strengthened contoured glass article (or flat glass sheet) may have a CS (which may be found at the surface or a depth within the glass article) of about 200 MPa or greater, 300 MPa or greater, 400 MPa or greater, about 500 MPa or greater, about 600 MPa or greater, about 700 MPa or greater, about 800 MPa or greater, about 900 MPa or greater, about 930 MPa or greater, about 1000 MPa or greater, or about 1050 MPa or greater. In one or more embodiments, the strengthened contoured glass article (or flat glass sheet) may have a CS (which may be found at the surface or a depth within the glass article) from about 200 MPa to about 1500 MPa, from about 250 MPa to about 1500 MPa, from about 300 MPa to about 1500 MPa, from about 350 MPa to about 1500 MPa, from about 400 MPa to about 1500 MPa, from about 450 MPa to about 1500 MPa, from about 500 MPa to about 1500 MPa, from about 550 MPa to about 1500 MPa, from about 600 MPa to about 1500 MPa, from about 200 MPa to about 1400 MPa, from about 200 MPa to about 1300 MPa, from about 200 MPa to about 1200 MPa, from about 200 MPa to about 1100 MPa, from about 200 MPa to about 1050 MPa, from about 200 MPa to about 1000 MPa, from about 200 MPa to about 950 MPa, from about 200 MPa to about 900 MPa, from about 200 MPa to about 850 MPa, from about 200 MPa to about 800 MPa, from about 200 MPa to about 750 MPa, from about 200 MPa to about 700 MPa, from about 200 MPa to about 650 MPa, from about 200 MPa to about 600 MPa, from about 200 MPa to about 550 MPa, or from about 200 MPa to about 500 MPa.

In one or more embodiments, the strengthened contoured glass article (or flat glass sheet) may have a maximum tensile stress or central tension (CT) of about 20 MPa or greater, about 30 MPa or greater, about 40 MPa or greater, about 45 MPa or greater, about 50 MPa or greater, about 60 MPa or greater, about 70 MPa or greater, about 75 MPa or greater, about 80 MPa or greater, or about 85 MPa or greater. In some embodiments, the maximum tensile stress or central tension (CT) may be in a range from about 40 MPa to about 100 MPa, from about 50 MPa to about 100 MPa, from about 60 MPa to about 100 MPa, from about 70 MPa to about 100 MPa, from about 80 MPa to about 100 MPa, from about 40 MPa to about 90 MPa, from about 40 MPa to about 80 MPa, from about 40 MPa to about 70 MPa, or from about 40 MPa to about 60 MPa.

After a strengthening process, the resulting strengthened contoured glass article (or flat glass sheet) can include a symmetric stress profile or an asymmetric stress profile. A symmetric stress profile exists when both major surfaces of the glass article are symmetrically chemical strengthened and exhibit substantially the same surface compressive stress and depth of compressive stress layer. In one or more embodiments, the resulting strengthened glass article can exhibit an asymmetric stress profile exists in which the glass article exhibits different surface compressive stress on one major surface compared to the opposing major surface, at locations on each major surface that are directly opposite from one another. In one or more embodiments, an asymmetric stress profile may be generated or an existing asymmetric stress profile may be enhanced (to have greater asymmetry) from cold-bending the flat glass sheet, as described herein.

In one or more embodiments, the contoured glass article may include a plurality of regions having the second thickness. For example, in FIGS. 1D, 2B and 3B, the glass article includes a plurality of regions having the second thickness. In one or more embodiments, the contoured glass article may include a plurality of bend regions. In the embodiments shown at FIGS. 1D, 2B and 3B, each bend region is located at a region having the second thickness; however, it is possible to have fewer bend regions than regions with the second thickness and greater bend regions than regions with the second thickness.

In one or more embodiments, the contoured glass article may include at least one bend region below a plane and at least one bend region above the plane. The plane in such embodiments is defined by as a midpoint of a maximum cross-sectional dimension.

In one or more embodiments, the at least one bend region has a bend radius (measured at the concave surface) of about 20 mm or greater, 40 mm or greater, 50 mm or greater, 60 mm or greater, 100 mm or greater, 250 mm or greater or 500 mm or greater. In one or more embodiments, the bend radius is in a range from about 50 mm to about 10,000 mm. For example, the bend radius may be in a range from about 20 mm to about 1500 mm, from about 30 mm to about 1500 mm, from about 40 mm to about 1500 mm, from about 50 mm to about 1500 mm, 60 mm to about 1500 mm, from about 70 mm to about 1500 mm, from about 80 mm to about 1500 mm, from about 90 mm to about 1500 mm, from about 100 mm to about 1500 mm, from about 120 mm to about 1500 mm, from about 140 mm to about 1500 mm, from about 150 mm to about 1500 mm, from about 160 mm to about 1500 mm, from about 180 mm to about 1500 mm, from about 200 mm to about 1500 mm, from about 220 mm to about 1500 mm, from about 240 mm to about 1500 mm, from about 250 mm to about 1500 mm, from about 260 mm to about 1500 mm, from about 270 mm to about 1500 mm, from about 280 mm to about 1500 mm, from about 290 mm to about 1500 mm, from about 300 mm to about 1500 mm, from about 350 mm to about 1500 mm, from about 400 mm to about 1500 mm, from about 450 mm to about 1500 mm, from about 500 mm to about 1500 mm, from about 550 mm to about 1500 mm, from about 600 mm to about 1500 mm, from about 650 mm to about 1500 mm, from about 700 mm to about 1500 mm, from about 750 mm to about 1500 mm, from about 800 mm to about 1500 mm, from about 900 mm to about 1500 mm, from about 950 mm to about 1500 mm, from about 1000 mm to about 1500 mm, from about 1250 mm to about 1500 mm, from about 20 mm to about 1400 mm, from about 20 mm to about 1300 mm, from about 20 mm to about 1200 mm, from about 20 mm to about 1100 mm, from about 20 mm to about 1000 mm, from about 20 mm to about 950 mm, from about 20 mm to about 900 mm, from about 20 mm to about 850 mm, from about 20 mm to about 800 mm, from about 20 mm to about 750 mm, from about 20 mm to about 700 mm, from about 20 mm to about 650 mm, from about 20 mm to about 200 mm, from about 20 mm to about 550 mm, from about 20 mm to about 500 mm, from about 20 mm to about 450 mm, from about 20 mm to about 400 mm, from about 20 mm to about 350 mm, from about 20 mm to about 300 mm, from about 20 mm to about 250 mm, from about 20 mm to about 200 mm, from about 20 mm to about 150 mm, from about 20 mm to about 100 mm, from about 20 mm to about 50 mm, from about 60 mm to about 1400 mm, from about 60 mm to about 1300 mm, from about 60 mm to about 1200 mm, from about 60 mm to about 1100 mm, from about 60 mm to about 1000 mm, from about 60 mm to about 950 mm, from about 60 mm to about 900 mm, from about 60 mm to about 850 mm, from about 60 mm to about 800 mm, from about 60 mm to about 750 mm, from about 60 mm to about 700 mm, from about 60 mm to about 650 mm, from about 60 mm to about 600 mm, from about 60 mm to about 550 mm, from about 60 mm to about 500 mm, from about 60 mm to about 450 mm, from about 60 mm to about 400 mm, from about 60 mm to about 350 mm, from about 60 mm to about 300 mm, or from about 60 mm to about 250 mm. In one or more embodiments, glass articles having a first thickness or second thickness of less than about 0.4 mm may exhibit a bend radius that is less than about 100 mm, or less than about 60 mm.

Figure 5:
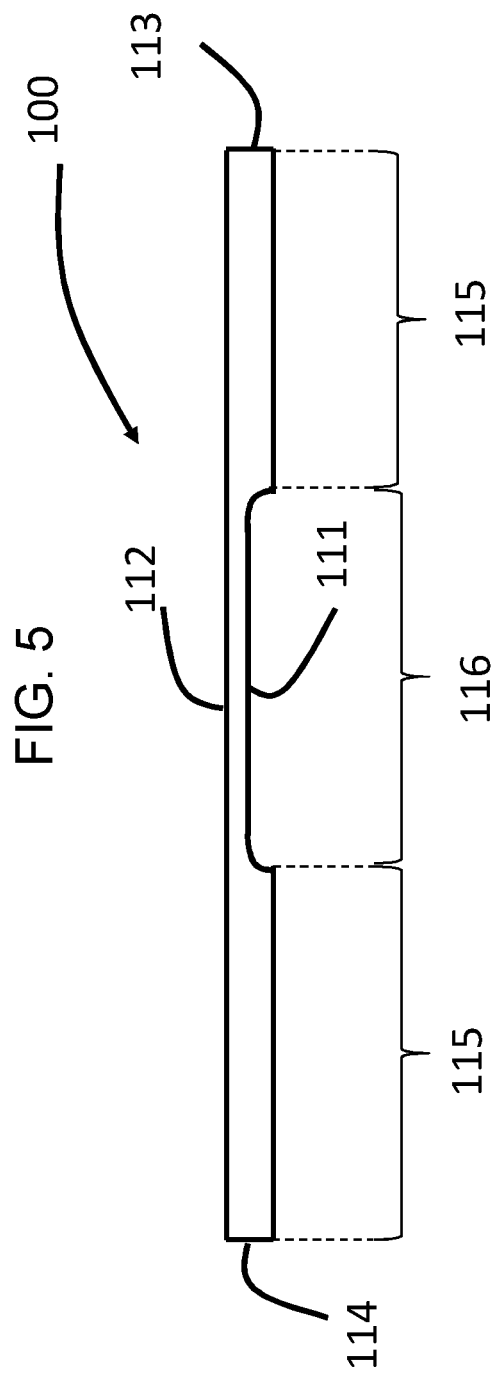
FIG. 5 is a side view illustration of a flat glass sheet according to one or more embodiments.

As shown in FIGS. 3B and 5, the contoured glass article may include a display and/or touch panel (200, 430) disposed behind the at least one region having the second thickness. In one or more embodiments, the display and/or touch panel may be disposed behind the at least one region having the first thickness. In one or more embodiments, a display panel and/or touch panel may be disposed behind both the at least one region having the first thickness and the at least one region having the second thickness.

In one or more embodiments, the contoured glass article is a window glass, a structural glass, a glass component of a vehicle, or a combination thereof.

A second aspect of this disclosure pertains to a method of making a contoured glass article.

In or more embodiments of the method of making a contoured glass article comprises cold bending a flat glass sheet 100. In one or more embodiments, as shown in FIG. 5, the flat glass sheet 100 has a first major surface 111, an second major surface 112 that opposes the first major surface (or second opposing major surfaces (111, 112, as shown in FIG. 1C and FIG. 5), at least one region having a first thickness 115, and at least one region having a second thickness 116, wherein the first thickness is greater than the second thickness. In one or more embodiments, the method includes cold bending the flat glass sheet 100 to produce a cold bent glass sheet as shown in FIG. 1C having at least one bend region (indicated by an arrow) along a portion of the at least one region having the second thickness (116). In one or more embodiments, the method includes cold bending the flat glass sheet to produce a cold bent glass sheet having more than one bend region, as shown in FIG. 1D.

In one or more embodiments, the method includes restraining the cold bent glass sheet to produce the contoured glass article, which still exhibits the first thickness that is greater than the second thickness. In one or more embodiments, restraining the cold bent glass sheet includes placing the cold bent glass sheet in a retaining frame that retains the cold bent glass sheet in a curved configuration or maintains the at least one bend in the cold bent glass sheet. The cold bent glass sheet may be placed in a retaining frame under tension. An adhesive or mechanical fasteners may be used to place and maintain the cold bent glass in the retaining frame. In one or more embodiments, restraining the cold bent glass sheet includes contacting the cold bent glass sheet with a pre-formed shape and an adhesive to bond the cold bent glass sheet to the pre-formed shape resulting in the contoured glass article.

In one or more embodiments, cold bending the glass sheet and the retaining the cold bent glass sheet (e.g., placing the cold bent glass sheet in the retaining frame) can be accomplished sequentially or simultaneously.

In one or more embodiments, the method includes strengthening the flat glass sheet before cold bending. For example, The flat glass sheet may be strengthened by any one or combinations of a thermal strengthening process, a chemical strengthening process and a mechanical strengthening process as described above with respect to the contoured glass article.

In one or more embodiments, the method may include strengthening at least one major surface of the cold bent glass sheet. For example, the at least one major surface or both major surfaces of the cold bent glass sheet may be strengthened thermally, mechanically or chemically as described herein.

In one or more embodiments, the flat glass sheet has a plurality of regions having the second thickness. In one or embodiments, the cold bent glass sheet may include a single bend region or a plurality of bend regions.

In one or more embodiments, the cold bent glass sheet can have, for example, at least one bend below a plane and at least one bend above a plane, the plane being defined by the plane of the first flat glass sheet.

In embodiments, the method includes thinning the flat glass sheet locally. For example, the method includes localized thinning of the flat glass sheet during or after formation of the glass article or a cover glass. In one or more embodiments, localized thinning of the flat glass sheet occurs during forming of the flat glass sheet and includes local stretching or drawing of the flat glass sheet. As used herein, this forming step is not used to create a bend. Instead, by thinning during the forming step, glass is locally heated and drawn (or stretched) so that the localized region is thinner than unheated and undrawn regions of the sheet. In one or more embodiments, the method may include strengthening the flat glass sheet with the locally thinned region formed by drawing and then subsequently cold bending the sheet with the bending occurring primarily in the thinner, more flexible region.

Examples of thinning after forming of the glass sheet include subtractive processes such as wet etching, dry etching, and sandblasting, which removes portions of the flat glass sheet to thin localized regions.

In one or more embodiments, the method of making a contoured glass article includes: localized thinning of a flat glass sheet in one or more regions or areas where a high bend or biaxial stress will occur. In one or more embodiments, after thinning, the flat glass sheet can be cold bent at or near the thinned region to a desired shape. The disclosed thinning and bending method produces lower stress in the cold bent glass sheet and/or the contoured glass article compared cold bent glass sheets or contoured glass articles having a constant thickness (which are shown in FIGS. 1A and 1B). Since the stiffness of the glass sheet or article is related to the cube of the glass thickness, i.e., (thickness)$^3$, a thinned and cold bent glass sheet or contoured article made according to embodiments of the present disclosure also reduces the retaining mechanism requirements or requirements for the frame required to restrain a cold-bent glass sheet into a contoured glass article throughout its life. Specifically, a cold bent glass sheet or contoured glass article having locally reduced thickness (i.e., thinned) experiences lower bend or biaxial stresses when in the bent configuration at the thinned location compared to at a thicker location. Similarly, a glass article having locally reduced stiffness requires less force from a retaining mechanism or framing structure to maintain the contoured glass article in a curved shape. These results in turn can provide a contoured product having reduced weight and reduced cost of the mechanical framing structure placed around the contoured glass article or a display/touch panel.

The embodiments described herein have the following exemplary advantages:
- the ability to achieve contoured glass articles with bends having a smaller bend radius;
- the ability to achieve contoured glass articles with complex, permanent curvatures;
- the ability to achieve contoured glass articles with increased mechanical reliability due to reduction of bend stresses;
- the ability to achieve contoured glass articles with reduced mechanical framing required to hold the shaped glass after cold bending throughout the products life;
- the ability to integrate larger displays into the contoured glass articles (i.e., displays can be bent along the bent regions to better match the curve of the contoured glass article and thus would not be limited to placement at flat regions);
- the ability to achieve contoured glass articles at lower processing costs compared to hot forming methods; and
- the ability to position a bend region(s) of a contoured glass article in a location where it is needed, which positioning permits display areas to remain flat and regions between displays to be curved.

Referring to the Figures, FIGS. 1A to 1B show a glass sheet that has been bent into shapes having constant thickness. In contrast, FIGS. 1C and 1D show cold bent glass sheets having similar shapes but have thinned regions at the locations where significant curvature occurs in the glass sheet. Curvatures made to the glass sheet can be positioned in regions or areas that have been locally thinned. The thicker regions in the glass sheet can remain flat or less curved compared to the thinned region(s). The thicker regions are potential locations for displays to be integrated or attached. In this instance, the parts can be bent into simple U- and S-shapes. More complex scenarios are also possible if the glass is thinned in more complex 2D patterns across its surface or if the display is also locally thinned. FIGS. 1A and 1B show cold bent glass sheets of constant thickness in simple U- and S-curves. FIGS. 1C and 1D show cold bent glass sheets having a first thickness and a second thickness, and having at least one region or side of localized thinning (see arrows). Localized thinning of glass sheets in areas where glass curves are to be made reduce the bend stress and the stiffness. A reduced stiffness of the resulting contoured glass article reduces the magnitude of the mechanical frame needed. The flatness of the non-thinned areas can also be increased if desired, and allows for straight forward display integration.

A locally thinned glass sheets can have displays (or other devices) integrated in the flat, thicker regions. The glass sheet can be locally thinned on either one or on both major surfaces. If the glass sheet is thinned on both surfaces, the thinned regions on each surface can be either aligned (i.e., coincident or co-located) or offset from each other.

In embodiments, the disclosure provides a method of making a display where a 3D glass form is selected and avoids excess stress on a display surface. In embodiments, the method provides for cold bending a flat glass sheet, having at least one region with a first thickness and at least one region with a second thickness, which leaves thicker or flatter areas situated between the bends for the display region.

In one or embodiments, the embodiments, the disclosure provides a contoured glass article, a display, and methods of making the same. In embodiments, the disclosure provides a contoured glass article and the integrated display (or other device). The contoured glass article can be an ion exchanged glass or another glass that can serve as a mechanical cover sheet for the display or device below it. In embodiments, the first thickness can be 3 mm or thinner including, for example, less than 1 mm, less than 0.7 mm, less than 0.5 mm, and less than 0.3 mm. The displays that may be integrated or combined with the contoured glass article include: LC displays, OLED displays, microLED displays, OLED lighting, touch sensors, speakers, instrument displays, and like other electronic devices.

In addition to display applications, the disclosed method and articles can be used in non-display applications that call for a shaped glass article that has bends or curves, for example, automotive lighting, instrument panels, touch sensors, mobile phone bodies, and like structures and uses.

In one or more alternative embodiments, instead of thinning the flat glass sheet in a simple single zone across its width, the method includes thinning the flat glass sheet in more complex patterns permits reduction of bend and biaxial stress as the glass article is subsequently cold bent in more complex 3D curvatures (thinning in this instance can be accomplished in the cover glass specifically where high stress would occur in the complex curvature). Such embodiments enable a reduction of stresses when the glass sheet is bent and mechanically isolates bends in different directions. Specific portions of the glass sheet can remain thicker where flatness, stiffness, or both properties are important. Thinning can be located in specific regions where local 2D or 3D bending or mechanical isolation is desired.).

In one or more alternative embodiments, instead of just locally thinning the flat glass sheet or contoured glass article, the display (or other device) can also be locally thinned. This enables cold bending of the display (or other device) in shapes that match the cover glass.

Figure 4:
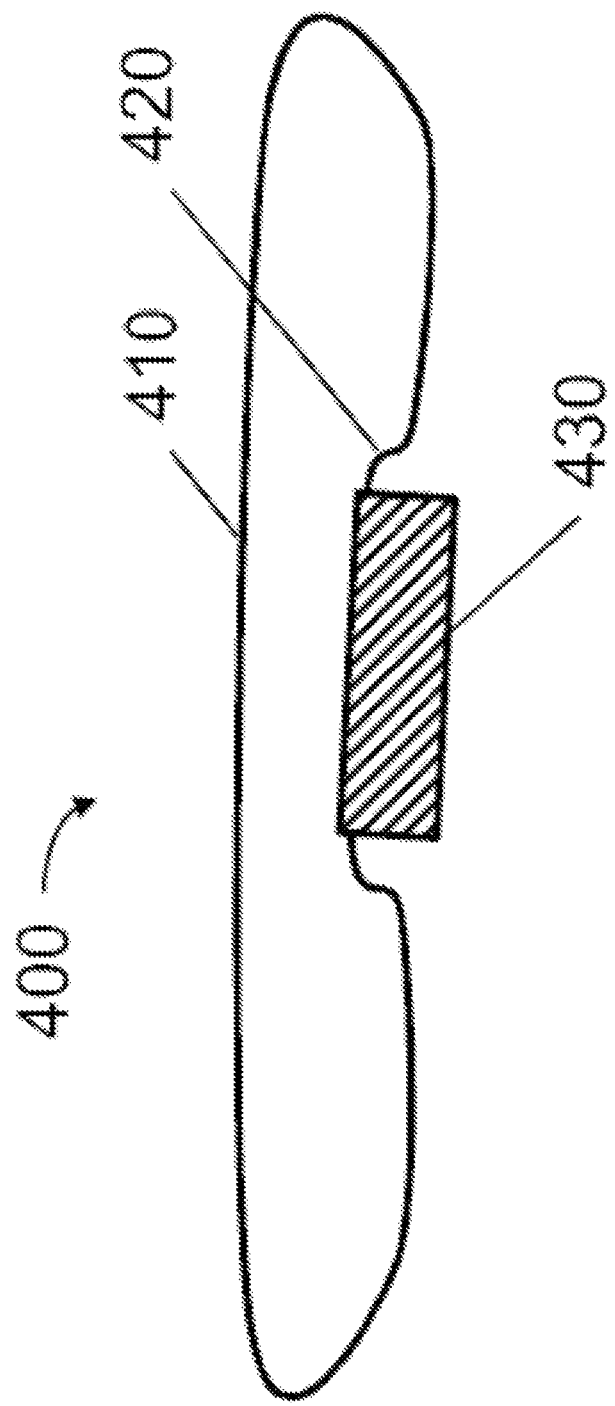
FIG. 4 schematically shows an example of a glass article according to one or more embodiments of this disclosure including a cold bent glass sheet, a frame (not shown) having localized thinning that can accommodate a functional item such as a display.

In one or more embodiments, local thinning can also be used to create a pocket, groove, shallow, or like thinned region, for the display (or other device) to be positioned into and as shown schematically in FIG. 4. FIG. 4 schematically shows an example of a glass article (400) of the disclosure that in embodiments can include a shaped glass piece (410) having a locally thinned area (420), which thinned area can accommodate a display element (430).

In embodiments, local thinning can also be used on glass sheets or articles having both hot formed and cold formed shapes to improve reliability and reduce system integration costs for complex surface designs.

In embodiments of the present process, local thinning of a display can be accomplished on the flat glass sheet either before or after the device fabrication has been completed. In one or more embodiments, local thinning of a flat glass sheet can occur before strengthening (e.g., by ion exchange) has been accomplished. In this instance, the flat glass sheet can be uniformly strengthened at a constant depth in regions both with and without local thinning. In this example, the ion exchange process can occur on locally thinned individual glass sheets or on a larger sized glass sheet. If individual glass sheets are used, they can be ion exchanged while flat or while held in complex shapes (i.e., as a cold bent glass sheet).

In embodiments, local thinning of the flat glass sheet can occur after an ion exchange step has been accomplished. In this instance, the areas of local thinning create an asymmetric stress profile assuming it is primarily etched on a single side. If the glass sheet is etched on both sides, the DOC and/or surface CS may still remain symmetric. This asymmetric etching highlights the possibility that a locally thinned part need not be uniformly ion exchanged across its surface.

In embodiments, local thinning can be accomplished by etching, and the etching can also be used to produce, for example, anti-glare or other effects.

In embodiments, local thinning can be accomplished after the cold bent glass sheet has been restrained (e.g., by placing in a frame). After the cold bent glass is in a frame, the glass can then be locally thinned by, for example, a subtractive process. A reason for this order of events is that it can be easier to handle the glass when it is in a frame.

In embodiments, local thinning can be applied to glass articles that contain both hot formed and cold formed shapes. The thinning can be accomplished as part of the hot forming process or as a post-process treatment for a hot formed part. In embodiments, local thinning can also be accomplished with parts having both hot formed and cold formed regions.

In embodiments, local thinning of sheets can be accomplished by etching or re-drawing. In the instance of re-drawing, this can also occur while hot forming processes are performed to shape the part.

In embodiments, any etching used for local thinning can be accomplished during processes that also produce through-hole vias.

In embodiments, local thinning of sheets can be accomplished on individual parts or on larger size panels.

In embodiments, local thinning of sheets can have a different ion exchange or composition profile compared to the other areas of the glass.

In embodiments, locally thinned regions or sections can have an etched surface on either face of the article, or on both faces of the article.

EXAMPLES

The following Examples demonstrate making, use, and analysis of the disclosed methods in accordance with the above general procedures.

Example 1 (Prophetic)

Sequential Processing A flat glass sheet, having at least one region having a first thickness and at least one region having a second thickness (the first thickness is greater than the second thickness), is cold bent to produce a second glass sheet having at least one bend. The cold bent glass sheet having the at least one bend is placed in or restrained in a fixture to produce a contoured glass article held in a fixture.

Example 2 (Prophetic)

Simultaneous Processing A first flat glass sheet, having at least one region having a first thickness and at least one region having a second thickness (the first thickness is greater than the second thickness), is simultaneously placed in or restrained in a fixture and cold bent to simultaneously produce a cold bent glass sheet having at least one bend and a contoured glass article held in a fixture.

Example 3 (Prophetic)

A flat glass sheet, having at least one region having a first thickness and at least one region having a second thickness, the first thickness is greater than the second thickness, is integrated with another element besides the frame, and cold bent. This cold bending can occur either before or after integration of the additional element. The integrated element can be, for example, an electronic display, another electronic or opto-electronic device, or optical element such as a mirror or element having a visual pattern.

Example 4 (Prophetic)

A flat glass sheet, having at least one region having a first thickness and at least one region having a second thickness (the first thickness is greater than the second thickness), integrated with an automotive application such as dashboard, console, door, within the automotive interior, on the automotive exterior, or other.

Aspect (1) of this disclosure pertains to a method of making a contoured glass article comprising: cold bending a flat glass sheet having first and second opposing major surfaces, at least one region having a first thickness, and at least one region having a second thickness, to produce cold bent glass sheet having at least one bend region along a portion of the at least one region having the second thickness; and restraining the cold bent glass sheet to produce the contoured glass article, wherein the first thickness is greater than the second thickness.

Aspect (2) of this disclosure pertains to the method of Aspect (1), wherein the cold bending and the retaining the cold bent glass sheet are accomplished sequentially or simultaneously.

Aspect (3) of this disclosure pertains to the method of Aspect (1) or Aspect (2), wherein at least one of the first and second major surfaces of the flat glass sheet is unstrengthened, annealed or heat strengthened.

Aspect (4) of this disclosure pertains to the method of any one of Aspects (1) through (3), wherein at least one of the first and second major surfaces of the flat glass sheet is strengthened.

Aspect (5) of this disclosure pertains to the method of Aspects (1) through (4), further comprising strengthening at least one of the first and second major surfaces of cold bent glass sheet.

Aspect (6) of this disclosure pertains to the method of Aspects (1) through (5), wherein the flat glass sheet has a plurality of regions having the second thickness.

Aspect (7) of this disclosure pertains to the method of Aspects (1) through (6), wherein the cold bent glass sheet has a single bend region or a plurality of bend regions.

Aspect (8) of this disclosure pertains to the method of Aspects (1) through (7), wherein the cold bent glass sheet has at least one bend below a plane and at least one bend above the plane, the plane being defined by the plane of the flat glass sheet.

Aspect (9) of this disclosure pertains to the method of Aspects (1) through (8), wherein the first thickness is in a range from about 500 micrometers to about 2 mm, and the second thickness is in a range from about 10% to 90% of the first thickness.

Aspect (10) of this disclosure pertains to the method of Aspects (1) through (9), wherein the first thickness is in a range from greater than about 500 micrometers to about 2 mm, and the second thickness is in a range from about 300 micrometers to less than 500 micrometers.

Aspect (11) of this disclosure pertains to the method of Aspects (1) through (10), wherein the at least one bend region has a bend radius in a range from about 50 mm to about 10,000 mm.

Aspect (12) of this disclosure pertains to the method of Aspects (1) through (11), further comprising disposing the contoured glass article over a display or touch panel, wherein the display or touch panel is positioned behind the at least one region having the first thickness.

Aspect (13) of this disclosure pertains to the method of Aspects (1) through (10), further comprising attaching a display or touch panel to the at least one region having the first thickness.

Aspect (14) of this disclosure pertains to a contoured glass article comprising:

a cold bent glass sheet having first and second opposing major surfaces, at least one region having a first thickness, at least one region having a second thickness, and at least one bend region along a portion of the at least one region having the second thickness, wherein the first thickness is greater than the second thickness.

Aspect (15) of this disclosure pertains to the contoured glass article of Aspect (14), further comprising a frame attached to the second major surface to retain the at least one bend region.

Aspect (16) of this disclosure pertains to the contoured glass article of Aspect (14) or Aspect (15), wherein at least one of the first and second major surfaces is unstrengthened, annealed or heat strengthened.

Aspect (17) of this disclosure pertains to the contoured glass article of any one of Aspects (14) through (16), wherein at least one of the first and second major surfaces is strengthened.

Aspect (18) of this disclosure pertains to the contoured glass article of any one of Aspects (14) through (17), comprising a plurality of regions having the second thickness.

Aspect (19) of this disclosure pertains to the contoured glass article of any one of Aspects (14) through (18), further comprising a plurality of bend regions.

Aspect (20) of this disclosure pertains to the contoured glass article of any one of Aspects (14) through (19), further comprising at least one bend region below a plane and at least one bend region above the plane, the plane being defined by as a midpoint of a maximum cross-sectional dimension.

Aspect (21) of this disclosure pertains to the contoured glass article of any one of Aspects (14) through (20), wherein the first thickness is in a range from about 500 micrometers to about 2 mm, and the second thickness is in a range from about 10% to 90% of the first thickness.

Aspect (22) of this disclosure pertains to the contoured glass article of any one of Aspects (14) through (21), wherein the first thickness is ion a range from greater than about 500 micrometers to about 2 mm, and the second thickness is in a range from about 300 micrometers to less than 500 micrometers.

Aspect (23) of this disclosure pertains to the contoured glass article of any one of Aspects (14) through (22), wherein the at least one bend region has a bend radius in a range from about 50 mm to about 10,000 mm.

Aspect 24) of this disclosure pertains to the contoured glass article of any one of Aspects (14) through (23), further comprising a display or touch panel disposed behind the at least one region having the second thickness.

Aspect (25) of this disclosure pertains to the contoured glass article of any one of Aspects (14) through (24), wherein the contoured glass article is a window glass, a structural glass, a glass component of a vehicle, or a combination thereof.

The disclosure has been described with reference to various specific embodiments and techniques. However, it should be understood that many variations and modifications are possible while remaining within the scope of the disclosure.

What is claimed is:

1. A method of making a contoured glass article comprising:
    cold bending a flat glass sheet having first and second opposing major surfaces, at least one region having a first thickness, and at least one region having a second thickness, to produce cold bent glass sheet having at least one bend region along a portion of the at least one region having the second thickness, wherein the cold bending occurs at a temperature that is below 200° C., wherein the first thickness is in a range from greater than 500 micrometers to 2 mm, and the second thickness is in a range from 300 micrometers to less than 500 micrometers; and
    restraining the cold bent glass sheet to produce the contoured glass article by attaching a frame to one of the first and second opposing surfaces such that the frame permanently maintains the at least one bend region in the cold-bent glass sheet, wherein the bend region comprises a bend radius of from 20 mm to 500 mm.

2. The method of claim 1, wherein the cold bending and the restraining the cold bent glass sheet are accomplished sequentially or simultaneously.

3. The method of claim 1, wherein at least one of the first and second major surfaces of the flat glass sheet is unstrengthened, annealed or heat strengthened.

4. The method of claim 1, wherein at least one of the first and second major surfaces of the flat glass sheet is strengthened.

5. The method of claim 1, further comprising strengthening at least one of the first and second major surfaces of cold bent glass sheet.

6. The method of claim 1, wherein the flat glass sheet has a plurality of regions having the second thickness.

7. The method of claim 1, wherein the cold bent glass sheet has a single bend region or a plurality of bend regions.

8. The method of claim 1, wherein the cold bent glass sheet has at least one bend below a plane and at least one bend above the plane, the plane being defined by the plane of the flat glass sheet.

9. The method of claim 1, further comprising disposing the contoured glass article over a display or touch panel, wherein the display or touch panel is positioned behind the at least one region having the first thickness, or attaching a display or touch panel to the at least one region having the first thickness.

10. A contoured glass article comprising:
a cold bent glass sheet having first and second opposing major surfaces, at least one region having a first thickness, at least one region having a second thickness, and at least one bend region along a portion of the at least one region having the second thickness, wherein the first thickness is greater than the second thickness, wherein the first thickness is in a range from greater than 500 micrometers to 2 mm, and the second thickness is in a range from 300 micrometers to less than 500 micrometers, and
a frame attached to the second major surface to permanently retain the at least one bend region such that the cold bent glass sheet exhibits an asymmetric surface compressive stress within the bend region, wherein the bend region comprises a bend radius of from 20 mm to 500 mm, wherein the second thickness is from 10% to 90% of the first thickness.

11. The contoured glass article of claim 10, wherein at least one of the first and second major surfaces is unstrengthened, annealed or heat strengthened.

12. The contoured glass article of claim 10, wherein at least one of the first and second major surfaces is strengthened.

13. The contoured glass article of claim 10, further comprising a plurality of regions having the second thickness.

14. The contoured glass article of claim 10, further comprising a plurality of bend regions.

15. The contoured glass article of claim 10, further comprising at least one bend region below a plane and at least one bend region above the plane, the plane being defined by as a midpoint of a maximum cross-sectional dimension.

16. The contoured glass article of claim 10, further comprising a display or touch panel disposed behind the at least one region having the second thickness.

17. The contoured glass article of claim 10, wherein the contoured glass article is a window glass, a structural glass, a glass component of a vehicle, or a combination thereof.

\* \* \* \* \*

UNITED STATES PATENT AND TRADEMARK OFFICE
CERTIFICATE OF CORRECTION

PATENT NO. : 11,685,684 B2
APPLICATION NO. : 16/613569
DATED : June 27, 2023
INVENTOR(S) : Kevin Thomas Gahagan et al.

It is certified that error appears in the above-identified patent and that said Letters Patent is hereby corrected as shown below:

On the Title Page

On the page 4, in Column 1, Item (56) under "U.S. Patent Documents", Line 73, delete "Lambright" and insert -- Lambricht --.

On the page 6, in Column 1, Item (56) under "Other Publications", Line 55, delete ""Pegaton" and insert -- "Pegatron --.

On the page 6, in Column 1, Item (56) under "Other Publications", Line 56, delete "CNSOLE" and insert -- CONSOLE --.

On the page 6, in Column 2, Item (56) under "Other Publications", Line 46, delete "lnternaitonal" and insert -- International --.

On the page 6, in Column 2, Item (56) under "Other Publications", Line 51, delete "Faade" and insert -- Facade --.

On the page 6, in Column 2, Item (56) under "Other Publications", Line 52, delete "Faade"," and insert -- Façade", --.

On the page 6, in Column 2, Item (56) under "Other Publications", Lines 55-56, after "Feb. 2004;" delete "Structural Design in Glass;".

On the page 6, in Column 2, Item (56) under "Other Publications", Line 57, delete "Weide;" and insert -- Weijde; --.

Signed and Sealed this
Second Day of January, 2024

Katherine Kelly Vidal
*Director of the United States Patent and Trademark Office*